(12) United States Patent
Washio et al.

(10) Patent No.: US 8,875,004 B2
(45) Date of Patent: Oct. 28, 2014

(54) TRANSMITTING APPARATUS AND COMMUNICATION SYSTEM

(75) Inventors: Kazunori Washio, Chiyoda-ku (JP); Satoshi Udou, Chiyoda-ku (JP); Yasuto Kanayama, Nagoya (JP)

(73) Assignee: Mitsubishi Electric Corporation, Tokyo (JP)

( * ) Notice: Subject to any disclaimer, the term of this patent is extended or adjusted under 35 U.S.C. 154(b) by 981 days.

(21) Appl. No.: 12/668,346

(22) PCT Filed: Jul. 10, 2007

(86) PCT No.: PCT/JP2007/063742
§ 371 (c)(1),
(2), (4) Date: Jan. 8, 2010

(87) PCT Pub. No.: WO2009/008062
PCT Pub. Date: Jan. 15, 2009

(65) Prior Publication Data
US 2010/0192048 A1 Jul. 29, 2010

(51) Int. Cl.
G06F 11/08 (2006.01)
H04L 1/00 (2006.01)
G06F 11/36 (2006.01)

(52) U.S. Cl.
CPC ............ H04L 1/0084 (2013.01); H04L 1/0061 (2013.01)
USPC .......................................... 714/799; 714/758

(58) Field of Classification Search
None
See application file for complete search history.

(56) References Cited

U.S. PATENT DOCUMENTS

| 5,535,208 | A | * | 7/1996 | Kawakami et al. | ........... 370/391 |
| 5,629,948 | A | | 5/1997 | Hagiwara et al. | |
| 5,729,251 | A | * | 3/1998 | Nakashima | ................... 709/250 |
| 5,768,533 | A | * | 6/1998 | Ran | ............................ 709/247 |
| 6,324,667 | B1 | * | 11/2001 | Sugaya | ....................... 714/746 |
| 6,813,284 | B2 | * | 11/2004 | Vayanos et al. | ............... 370/537 |
| 7,039,038 | B2 | | 5/2006 | Shoemake | |
| 7,505,455 | B1 | * | 3/2009 | Goodwin et al. | ............. 370/356 |
| 7,519,048 | B2 | * | 4/2009 | Kobayashi | .................... 370/352 |

(Continued)

FOREIGN PATENT DOCUMENTS

| EP | 1 175 034 A2 | 1/2002 |
| JP | 58-210741 A | 12/1983 |

(Continued)

OTHER PUBLICATIONS

Supplementary European Search Report dated Mar. 7, 2013 for EP 07 79 0560.

*Primary Examiner* — Ajay Bhatia
*Assistant Examiner* — Dipakkumar Gandhi
(74) *Attorney, Agent, or Firm* — Sughrue Mion, PLLC; Richard C. Turner

(57) ABSTRACT

A transmitting apparatus included in a communication system that performs message communication using an error detection code with a receiving apparatus, the transmitting apparatus includes a transmission interval determining means that, based on a parameter related to a transmission error non-detection probability of a message per time, a data length of the message, and a code length of the error detection code used for the message, determines a transmission interval for transmitting the message, so that the transmission error non-detection probability of the message satisfies a condition related to a transmission error non-detection probability included in the parameter, wherein the message is transmitted to the receiving apparatus, based on the transmission interval determined by the transmission interval determining means.

36 Claims, 28 Drawing Sheets

(56) References Cited

U.S. PATENT DOCUMENTS

| | | |
|---|---|---|
| 2003/0103243 A1 | 6/2003 | Watanabe et al. |
| 2004/0015603 A1 | 1/2004 | Griessbach et al. |
| 2007/0016842 A1* | 1/2007 | Samuel et al. ............... 714/781 |
| 2008/0010434 A1* | 1/2008 | Jitsukawa et al. ............... 712/1 |
| 2008/0310352 A1* | 12/2008 | McBeath et al. ............. 370/329 |

FOREIGN PATENT DOCUMENTS

| | | |
|---|---|---|
| JP | 64-078543 A | 3/1989 |
| JP | 06-021920 A | 1/1994 |
| JP | 06-204988 A | 7/1994 |
| JP | 07-038540 A | 2/1995 |
| JP | 09-139727 A | 5/1997 |
| JP | 10-233700 A | 9/1998 |
| JP | 11-215136 A | 8/1999 |
| JP | 2000-114987 A | 4/2000 |
| JP | 2002-314626 A | 10/2002 |
| JP | 2003-513512 A | 4/2003 |
| JP | 2003-169090 A | 6/2003 |
| JP | 2004-088246 A | 3/2004 |
| JP | 2004-128640 A | 4/2004 |
| JP | 2004-140861 A | 5/2004 |
| JP | 2005-143015 A | 6/2005 |
| JP | 2006-180172 A | 7/2006 |

* cited by examiner

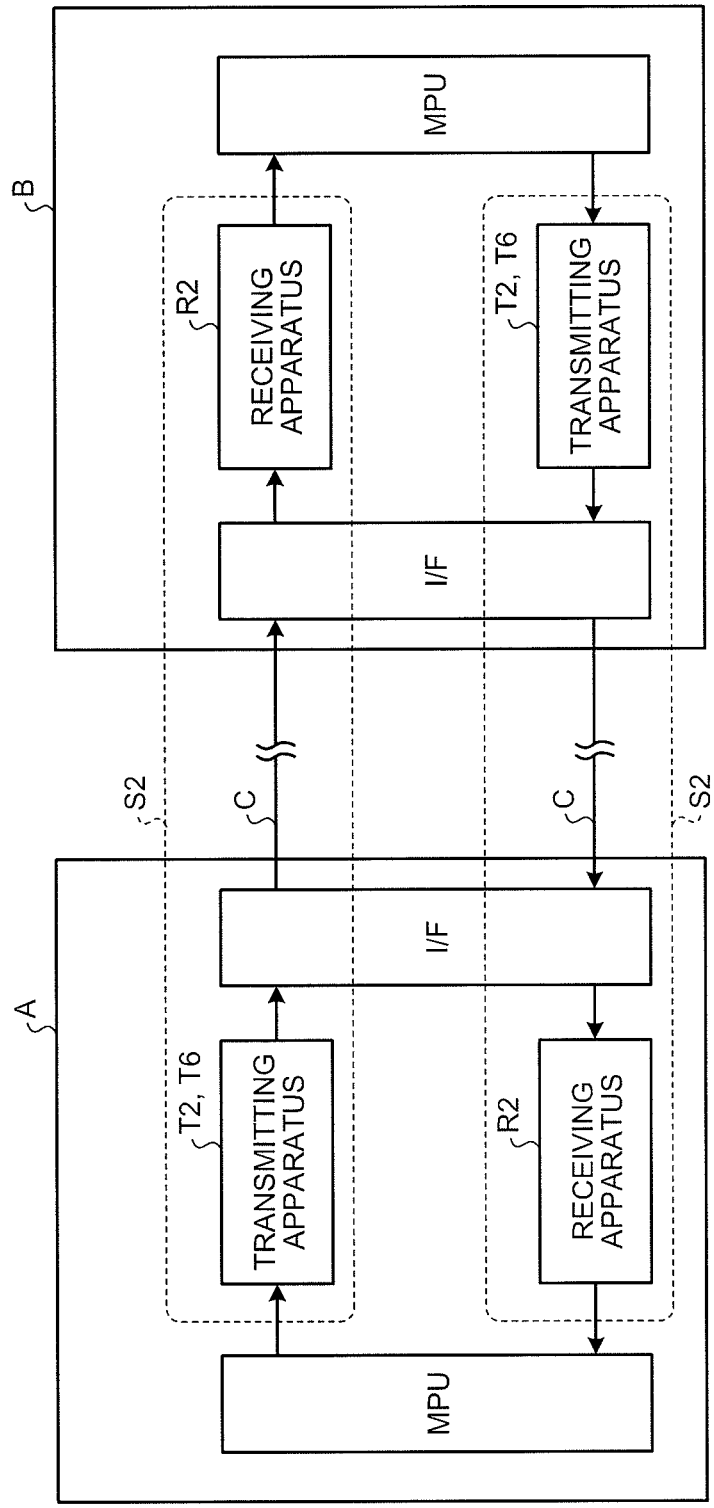

FIG.2-3

| IDENTIFICATION INFORMATION | CODE LENGTH | GENERATOR POLYNOMIAL |
|---|---|---|
| 1 | 8 | $x^8+x^2+x+1$ |
| 2 | 12 | $x^{12}+x^{11}+x^3+x^2+x+1$ |
| 3 | 16 | $x^{16}+x^{15}+x^2+x+1$ |
| 4 | 32 | $x^{32}+x^{26}+x^{23}+x^{22}+x^{16}+x^{12}+x^{11}+x^{10}+x^8+x^7+x^5+x^4++x^2+x+1$ |

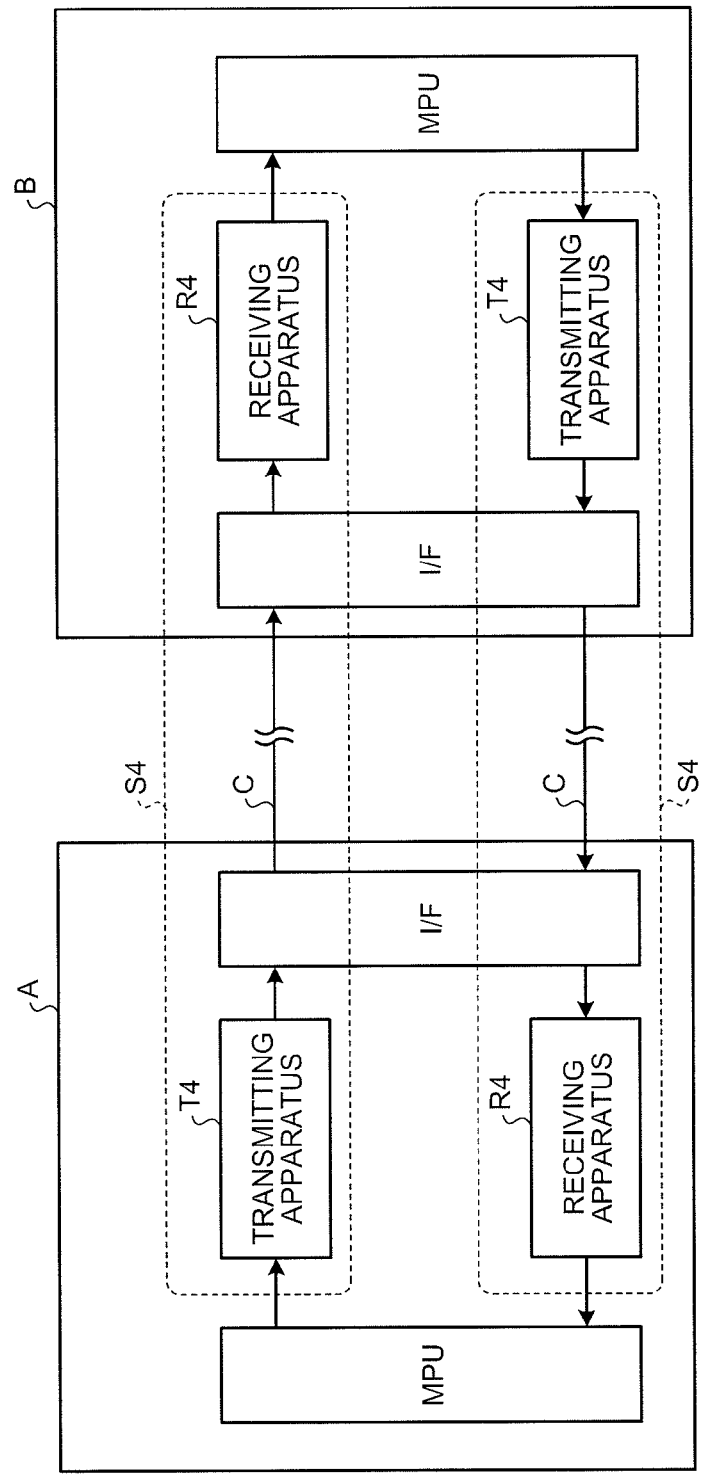

TRANSMITTING APPARATUS AND COMMUNICATION SYSTEM

TECHNICAL FIELD

The present invention relates to a transmitting apparatus and a communication system, and more specifically, the present invention relates to a transmitting apparatus and a communication system for performing communication required to ensure a transmission error non-detection probability per time.

BACKGROUND ART

Technologies to improve reliability of correct communication in signal transmission paths have been carried out by a transmitting side transmitting messages by adding an error detection code such as a cyclic redundancy check (CRC) to the messages, and a receiving side verifying the code in the received messages.

Another example resides in that a transmitting side transmits signals by dividing data into segments with a fixed signal length and generates a CRC for each of the divided segments with a fixed signal length, and a receiving side receives the signal and determines an error in each of the divided segments with a fixed signal length. Accordingly, the reliability of correct communication can further be improved. A technology that is a method of protecting data transmission in a data bus, and in which at least one of data messages is transferred from a transmitting unit through the data bus, the data messages include a variable length data field and a checksum (CRC), and a receiving unit determines the data transfer quality based on the check sum is also known (for example, see Patent Document 1).

[Patent Document 1] Japanese Patent Application Laid-open No. 2003-513512

DISCLOSURE OF INVENTION

Problem to be Solved by the Invention

However, in the above-described conventional transmission methods, quantitative evaluation is not performed on the error detection probability. Accordingly, they are difficult to use for the purpose in which a desired transmission error non-detection probability of a message per time needs to be ensured. In other words, the conventional transmission methods cannot restrain the transmission error non-detection probability of the message to equal to or less than a certain target value. Consequently, for example, because data related to safety is also transmitted during communication for Factory Automation (FA), a large number of message transmission errors cause problems. Because unnecessary data division and coding are also often performed to ensure desired reliability of correct communication, transmission efficiency cannot be improved.

The present invention has been made in view of the above circumstances, and intended to provide a communication apparatus, a receiving apparatus, and a communication system in which the required reliability of correct communication is quantitatively ensured, and that enables efficient communication.

Means for Solving Problem

In order to solve the above mentioned problem and achieve the object, a transmitting apparatus according to the present invention included in a communication system that performs message communication using an error detection code with a receiving apparatus, the transmitting apparatus includes a transmission interval determining means that, based on a parameter related to a transmission error non-detection probability of a message per time, a data length of the message, and a code length of the error detection code used for the message, determines a transmission interval for transmitting the message, so that the transmission error non-detection probability of the message satisfies a condition related to a transmission error non-detection probability included in the parameter, wherein the message is transmitted to the receiving apparatus, based on the transmission interval determined by the transmission interval determining means.

EFFECT OF THE INVENTION

The communication system according to the present invention can advantageously obtain reliability of correct communication required to transmit signals, because it is possible to quantitatively ensure correct communication. It is also possible to advantageously obtain a communication system that enables efficient communication, because unnecessary data division and coding are not performed.

BRIEF DESCRIPTION OF DRAWINGS

FIG. 1-2 is a block diagram for explaining a configuration of a transmitting apparatus of the communication system according to the first embodiment of the present invention.

FIG. 1-3 is a diagram illustrating a configurational example of transmission data (message) assembled by the transmitting apparatus of the communication system according to the first embodiment of the present invention.

FIG. 1-4 is a flowchart for explaining a process performed by the transmitting apparatus according to the first embodiment of the present invention.

FIG. 1-5 is a block diagram for explaining a configuration of a receiving apparatus of the communication system according to the first embodiment of the present invention.

FIG. 1-6 is a flowchart for explaining a process performed by the receiving apparatus according to the first embodiment of the present invention.

FIG. 2-1 is a diagram for explaining a configuration of a communication system according to a second embodiment of the present invention.

FIG. 2-2 is a block diagram for explaining a configuration of a transmitting apparatus of the communication system according to the second embodiment of the present invention.

FIG. 2-3 is a diagram illustrating an example of a code correspondence table of the communication system according to the second embodiment of the present invention.

FIG. 2-4 is a flowchart for explaining a process performed by the transmitting apparatus according to the second embodiment of the present invention.

FIG. 2-5 is a block diagram for explaining a configuration of a receiving apparatus of the communication system according to the second embodiment of the present invention.

FIG. 2-6 is a flowchart for explaining a process performed by the receiving apparatus according to the second embodiment of the present invention.

FIG. 3-1 is a diagram for explaining a configuration of a communication system according to a third embodiment of the present invention.

FIG. 3-2 is a block diagram for explaining a configuration of a transmitting apparatus of the communication system according to the third embodiment of the present invention.

FIG. 3-3 is a flowchart for explaining a process performed by the transmitting apparatus according to the third embodiment of the present invention.

FIG. 3-4 is a block diagram for explaining a configuration of a receiving apparatus of the communication system according to the third embodiment of the present invention.

FIG. 3-5 is a flowchart for explaining a process performed by the receiving apparatus according to the third embodiment of the present invention.

FIG. 4-1 is a diagram for explaining a configuration of a communication system according to a fourth embodiment of the present invention.

FIG. 4-2 is a block diagram for explaining a configuration of a transmitting apparatus of the communication system according to the fourth embodiment of the present invention.

FIG. 4-3 is a flowchart for explaining a process performed by the transmitting apparatus according to the fourth embodiment of the present invention.

FIG. 4-4 is a block diagram for explaining a configuration of a receiving apparatus of the communication system according to the fourth embodiment of the present invention.

FIG. 4-5 is a flowchart for explaining a process performed by the receiving apparatus according to the fourth embodiment of the present invention.

FIG. 5-1 is a block diagram for explaining a configuration of a transmitting apparatus of a communication system according to a fifth embodiment of the present invention.

FIG. 5-2 is a flowchart for explaining a process performed by the transmitting apparatus according to the fifth embodiment of the present invention.

FIG. 6-1 is a block diagram for explaining a configuration of a transmitting apparatus of a communication system according to a sixth embodiment of the present invention.

FIG. 6-2 is a flowchart for explaining a process performed by the transmitting apparatus according to the sixth embodiment of the present invention.

FIG. 7-1 is a block diagram for explaining a configuration of a transmitting apparatus of a communication system according to a seventh embodiment of the present invention.

FIG. 7-2 is a flowchart for explaining a process performed by the transmitting apparatus according to the seventh embodiment of the present invention.

Figure 1:
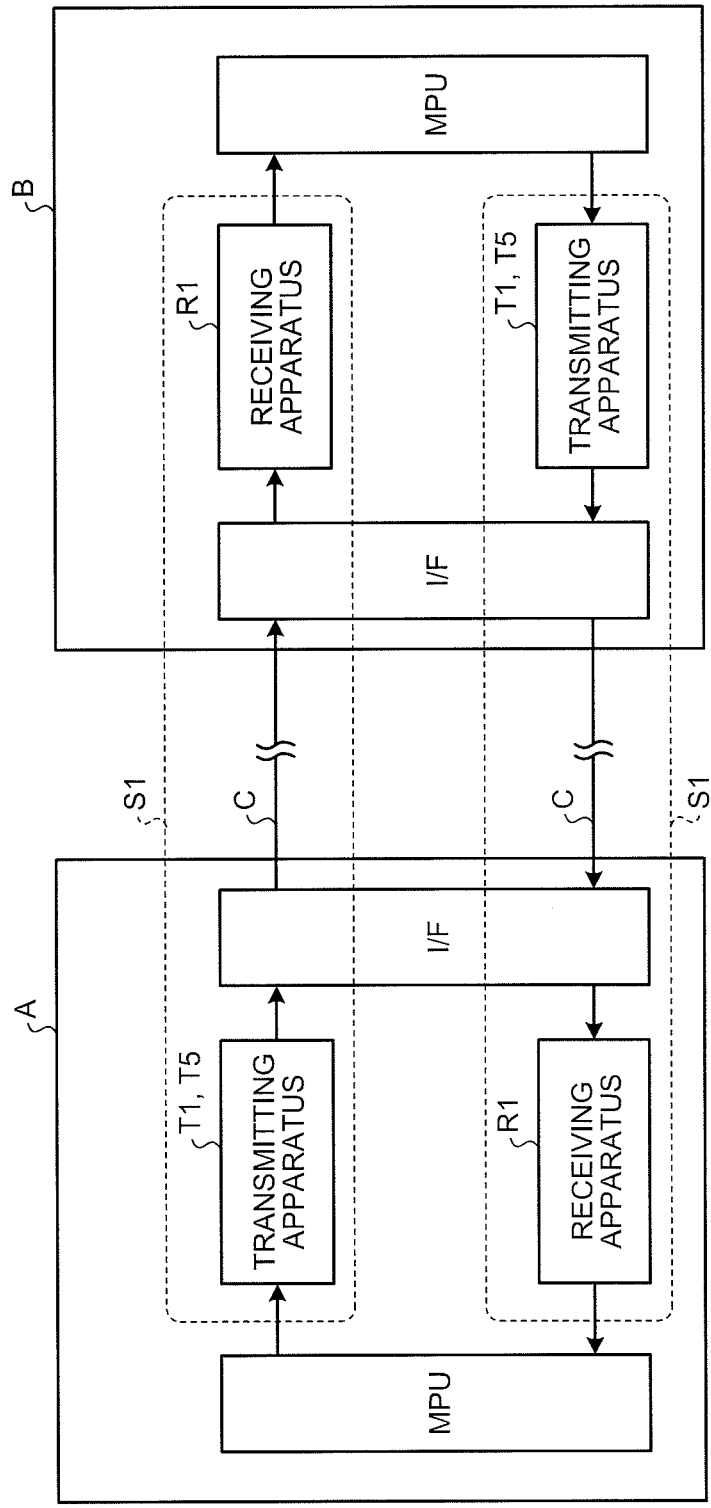
FIG. 1-1 is a diagram for explaining a configuration of a communication system according to a first embodiment of the present invention.

EXPLANATIONS OF LETTERS OR NUMERALS 1 parameter input unit
2 transmission error non-detection probability judging unit
3 header and data input unit
4 division length determining unit
5 data dividing unit
6 data CRC generating unit
7 transmission data assembling unit
8 transmitting unit
9 code length determining unit
10 division length and code length determining unit
11 header CRC generating unit
21 receiving unit
22 division length judging unit
23 data dividing unit
24 data CRC judging unit
25 data assembling unit
26 data output unit
27 code length judging unit
28 division length and code length judging unit
29 header CRC judging unit
30 header judging unit
31 code correspondence table

BEST MODE(S) FOR CARRYING OUT THE INVENTION

Exemplary embodiments of a communication apparatus, a receiving apparatus, and a communication system according to the present invention will be described in detail with reference to the accompanying drawings. However, the present invention is not limited to the following description, and changes may be appropriately made without departing from the spirit and scope of the present invention.

First Embodiment

FIG. 1-1 is a diagram for explaining a configuration of a communication system according to a first embodiment of the present invention. A communication system S1 according to the first embodiment includes a transmitting apparatus T1 and a receiving apparatus R1 connected with a communication line C. In FIG. 1-1, one communication system S1 includes the transmitting apparatus T1 mounted on equipment A for Factory Automation (FA), and the receiving apparatus R1 mounted on equipment B for FA. Another communication system S1 includes the transmitting apparatus T1 mounted on the equipment B and the receiving apparatus R1 mounted on the equipment A. The equipment A is a control device such as a Programmable Controller (PLC). The equipment B is a controllable object such as a processing device.

The Programmable Controller (PLC) (equipment A) that is a control device, for example, includes a Micro Processing Unit (MPU) that controls a process performed in the Programmable Controller (PLC), a system program Read-Only Memory (ROM) that stores therein a system program for executing a basic operation in the Programmable Controller (PLC), and a system work RAM that is a memory region used by the system program. The Programmable Controller also includes an interface (in the diagram, referred to as data bus I/F) used to communicate with the FA equipment B, a user program Random Access Memory (RAM) that stores therein a user program executed by the Programmable Controller (PLC), and user data RAM that stores therein data used by the user program. The processing units are connected by a bus. In FIG. 1-1, illustrations other than the interface (in the diagram, referred to as data bus I/F) and the MPU are omitted.

The processing device (equipment B) that is a controllable object, for example, includes low-order equipment to be controlled in the processing device such as a motor, a Micro Processing Unit (MPU) that controls a process performed by the processing device, and an interface (in the diagram, referred to as data bus I/F) used to communicate with the FA equipment B. The processing units are connected by a bus. In FIG. 1-1, illustrations other than the interface (in the diagram, referred to as data bus I/F) and the MPU are omitted.

Figures 1, 2:
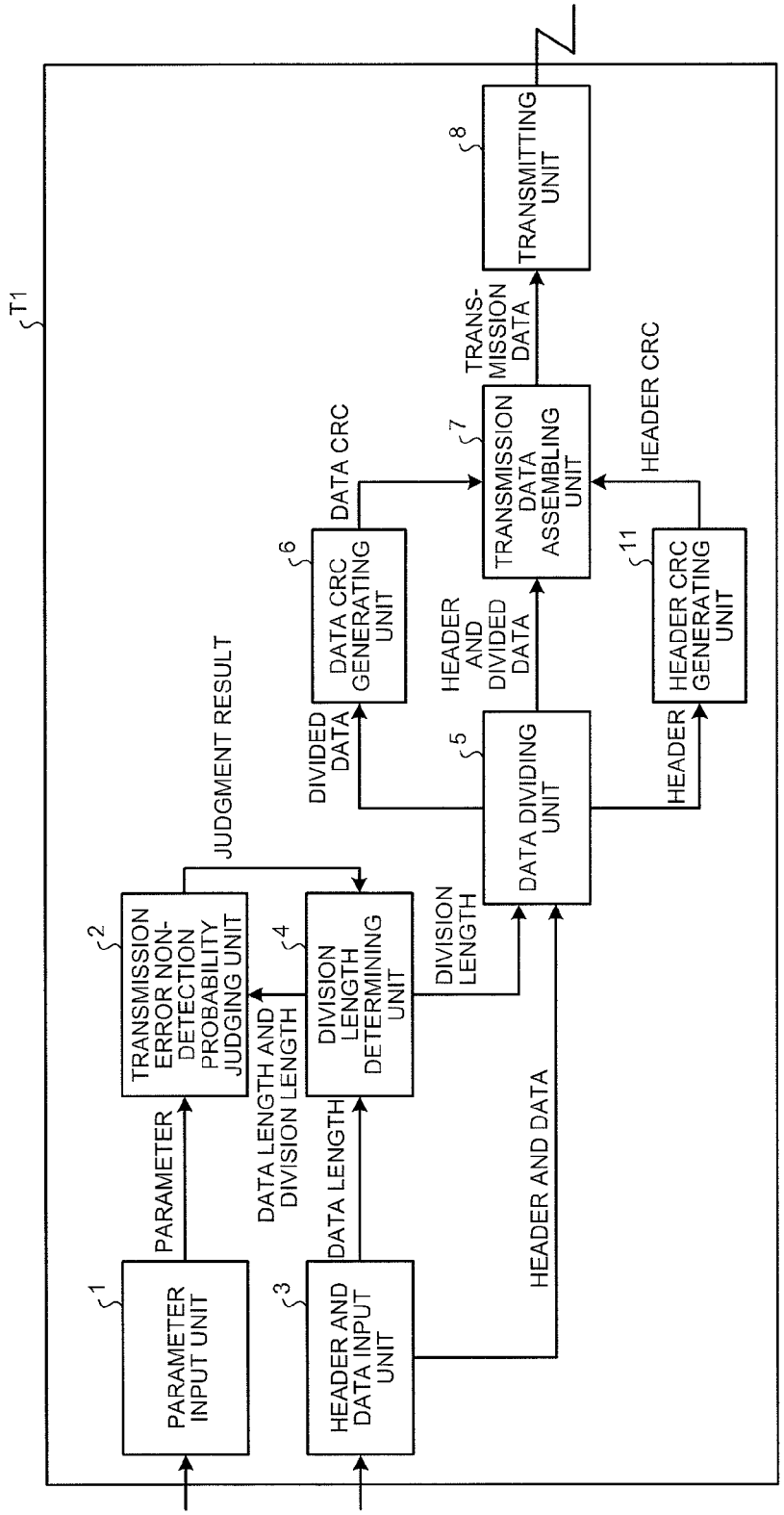

The communication system S1 that includes the transmitting apparatus T1 and the receiving apparatus R1 will now be described. FIG. 1-2 is a block diagram for explaining a configuration of the transmitting apparatus T1 of the communication system S1 according to the first embodiment. The transmitting apparatus T1 includes a parameter input unit 1, a transmission error non-detection probability judging unit 2, a header and data input unit 3, a division length determining unit 4, a data dividing unit 5, a data CRC generating unit 6, a header CRC generating unit 11, a transmission data assembling unit 7, and a transmitting unit 8.

The functions of the units will now be described. The parameter input unit 1 receives a parameter related to a transmission error non-detection probability of a message per time, before the transmitting apparatus T1 receives data to be transmitted. The parameter includes a reference value of the transmission error non-detection probability of the message per time, a probability of generating bit errors in a communication channel, a transmission rate of the communication channel, the number of messages (transmission data) per unit time, and the number of pieces of communication equipment being connected. The parameter input unit 1 sends the received parameter to the transmission error non-detection probability judging unit 2.

The header and data input unit 3 receives data to be transmitted, for example, from an application running in the equipment A, after the parameter input unit 1 receives the parameter. The header and data input unit 3 sends the data length of the data to the division length determining unit 4, and sends a header and data to the data dividing unit 5. The division length determining unit 4 sets the data length received from the header and data input unit 3 as an initial value of the division length (initialization of division length), and sends the division length and the data length to the transmission error non-detection probability judging unit 2.

The transmission error non-detection probability judging unit 2 stores therein a predetermined evaluation function related to a transmission error non-detection probability, and calculates a transmission error non-detection probability (probability that cannot detect transmission errors=error rate) $\Lambda$ by using the evaluation function. The transmission error non-detection probability judging unit 2 also calculates other condition values required for communication. In the first embodiment, the transmission error non-detection probability judging unit 2 calculates a transmission error non-detection probability $\Lambda$, based on the data length and the division length received from the division length determining unit 4, the parameter received from the parameter input unit 1, and a CRC code length (generator polynomial). Here, a predetermined CRC code length (generator polynomial) stored in the transmission error non-detection probability judging unit 2 is used.

The transmission error non-detection probability judging unit 2 determines whether the calculated transmission error non-detection probability $\Lambda$ satisfies a reference value of the transmission error non-detection probability of the parameter, and notifies the division length determining unit 4 of the judgment result. The judgment result is either NG (the calculated transmission error non-detection probability $\Lambda$ does not satisfy the reference value of the transmission error non-detection probability) or OK (the calculated transmission error non-detection probability $\Lambda$ satisfies the reference value of the transmission error non-detection probability).

For example, the following formula (1) may be used to calculate an evaluation function $f(n, p, v, d, m)$ for calculating the transmission error non-detection probability $\Lambda$ per unit time.

$$\Lambda = 3600 \times R(p) \times v \times (m-1) \quad (1)$$

Here, v is the number of messages (transmission frequency) per one second, and m is the number of devices being connected including the transmitting apparatus.

$R(p)$ is a transmission error non-detection probability per one message, when a probability of generating bit errors in a communication channel is p, and is generally calculated by the following formula:

$$R(p) = \Sigma(e=d \text{ to } n)\{A(n,e) \times p\hat{\ }e \times (1-p)\hat{\ }(n-e)\}$$

Here, $\Sigma(e=d \text{ to } n)$ means a sum of a value e from d to n, for the subsequent expression in the curly brackets. d is a characteristic value of an error detection code (Hamming distance). $A(n, e)$ is a two-term formula, and is expressed by the following formula:

$$(n,e) = n!\times e!/(n-e)!$$

n is the message length (the number of bits in a frame), and n! is the factorial of n. $p\hat{\ }e$ is p raised to the e-th power. $R(p)$ may also be a value in which the characteristics of an error detection code such as a CRC is taken into consideration.

Upon receiving the judgment result from the transmission error non-detection probability judging unit 2, and if the judgment result is NG (the calculated transmission error non-detection probability $\Lambda$ does not satisfy the reference value of the transmission error non-detection probability), the division length determining unit 4 reduces the division length, and notifies the transmission error non-detection probability judging unit 2 of the data length and the reduced division length again. Upon receiving the judgment result from the transmission error non-detection probability judging unit 2, and if the judgment result is OK (the calculated transmission error non-detection probability $\Lambda$ satisfies the reference value of the transmission error non-detection probability), the division length determining unit 4 sends the division length to the data dividing unit 5.

The data dividing unit 5 stores the division length received from the division length determining unit 4 in the header received from the header and data input unit 3, and sends the header to the header CRC generating unit 11 and the transmission data assembling unit 7. The data dividing unit 5 also divides the data received from the header and data input unit 3, based on the division length received from the division length determining unit 4, and sends the divided data to the data CRC generating unit 6 and the transmission data assembling unit 7.

The data CRC generating unit 6 generates a data CRC based on the divided data received from the data dividing unit 5, by calculating the data CRC using a predetermined CRC generator polynomial stored therein, and sends the data CRC to the transmission data assembling unit 7. The header CRC generating unit 11 generates a header CRC based on the header received from the data dividing unit 5 by calculating the header CRC by using a predetermined CRC generator polynomial stored therein, and sends the header CRC to the transmission data assembling unit 7.

The transmission data assembling unit 7 assembles transmission data (message) with the header and the divided data received from the data dividing unit 5, the header CRC received from the header CRC generating unit 11, and the data CRC received from the data CRC generating unit 6, and sends the transmission data (message) to the transmitting unit 8.

Figures 1, 2, 3:
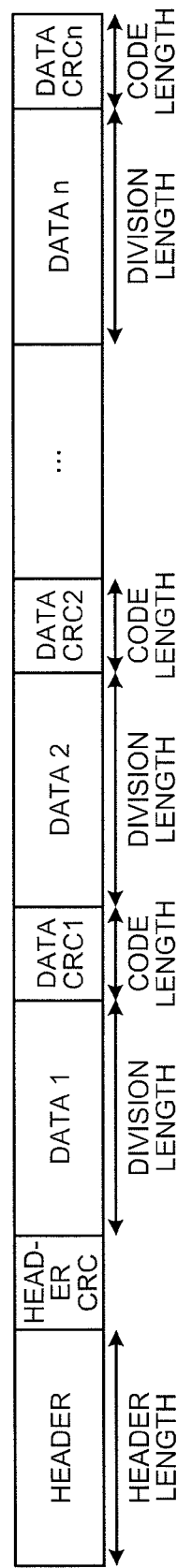

The transmitting unit 8 transmits the transmission data (message) received from the transmission data assembling unit 7 to the communication line C. FIG. 1-3 is a diagram illustrating a configurational example of transmission data (message) being assembled. The transmission data (message) shown in FIG. 1-3 is transmission data in which data is divided into n segments, and includes a header, a header CRC for the header, divided data 1, a data CRC1 for the data 1, divided data 2, a data CRC2 for the data 2, . . . , divided data n, and a data CRCn for the data n.

A transmission process performed by the transmitting apparatus T1 will be described with reference to FIG. 1-4. FIG. 1-4 is a flowchart for explaining a process performed by the transmitting apparatus T1 according to the first embodiment. The parameter input unit 1 receives a parameter (Step S1). For example, a calculator such as a personal computer is connected to the transmitting apparatus T1, and the parameter input unit 1 receives the parameter from the personal computer and the like. The parameter input unit 1 sends the received parameter to the transmission error non-detection probability judging unit 2.

The header and data input unit 3 receives data to be transmitted to the receiving apparatus R1, for example, from an application running in the equipment A, after the parameter input unit 1 receives the parameter. The header and data input unit 3 then sends the data length of the data to the division length determining unit 4, and sends a header and data to the data dividing unit 5.

Upon receiving the data length from the header and data input unit 3, the division length determining unit 4 sets (initializes) the received data length as an initial value of the division length (Step S2). The division length determining unit 4 then sends the division length and the data length to the transmission error non-detection probability judging unit 2. The transmission error non-detection probability judging unit 2 calculates a transmission error non-detection probability Λ, based on the data length and the division length received from the division length determining unit 4, the parameter received from the parameter input unit 1, and the CRC code length (generator polynomial) (in FIG. 1-4, referred to as error rate. The same applies to the following diagrams.) (Step S3).

The transmission error non-detection probability judging unit 2 determines whether the calculated transmission error non-detection probability Λ satisfies the reference value of the transmission error non-detection probability of the parameter (Step S4), and notifies the division length determining unit 4 of the judgment result. The judgment result of either NG (the calculated transmission error non-detection probability Λ does not satisfy the reference value of the transmission error non-detection probability) or OK (the calculated transmission error non-detection probability Λ satisfies the reference value of the transmission error non-detection probability) is notified.

If the received judgment result is NG (NO at Step S4), the division length determining unit 4 reduces the division length, notifies the transmission error non-detection probability judging unit 2 of the data length and the reduced division length again (Step S5), and starts again from Step S3. If the received judgment result is OK (YES at Step S4), the division length determining unit 4 adopts the division length at this time, and sends the division length to the data dividing unit 5.

The data dividing unit 5 stores the division length received from the division length determining unit 4, in the header received from the header and data input unit 3 and in which information such as an address of a message is included (Step S6). The data dividing unit 5 then sends the header to the header CRC generating unit 11 and the transmission data assembling unit 7. The header CRC generating unit 11 generates a header CRC based on the header received from the data dividing unit 5, by using a predetermined CRC generator polynomial stored therein (Step S7), and sends the header CRC to the transmission data assembling unit 7.

The data dividing unit 5, based on the division length received from the division length determining unit 4, divides the data received from the header and data input unit 3 into segments of the division length and extracts the divided data segments (Step S8). The data dividing unit 5 then sends the divided data to the data CRC generating unit 6 and the transmission data assembling unit 7. The data CRC generating unit 6 generates a data CRC from the divided data received from the data dividing unit 5 by calculating the data CRC using a predetermined CRC generator polynomial stored therein (Step S9), and sends the data CRC to the transmission data assembling unit 7.

The transmission data assembling unit 7 assembles transmission data (message) with the header and the divided data received from the data dividing unit 5, the header CRC received from the header CRC generating unit 11, and the data CRC received from the data CRC generating unit 6 (Step S10). The transmission data assembling unit 7 then determines whether the extraction (assembly) of the divided data received from the data dividing unit 5 is completed (Step S11).

If the transmission data assembling unit 7 determines that the extraction is not yet completed (NO at Step S11), the process returns to Step S8 and the process is repeated until the extraction is completed. If the transmission data assembling unit 7 determines that the extraction is completed (YES at Step S11), the transmission data assembling unit 7 sends the transmission data (message) to the transmitting unit 8. The transmitting unit 8 transmits the transmission data (message) received from the transmission data assembling unit 7 to the communication line C, and finishes the series of processes (Step S12). The transmission data (message) transmitted from the transmitting apparatus T1 is sent to the receiving apparatus R1 through the communication line C.

Every time the transmitting apparatus T1 receives data from the application running in the equipment A, the process is repeated from Step S1 to Step S12. However, when the same parameters are used, the process at Step S1 may be omitted in the second and subsequent processes.

FIG. 1-5 is a block diagram for explaining a configuration of the receiving apparatus R1 of the communication system S1 according to the first embodiment. The receiving apparatus R1 includes a receiving unit 21, a division length judging unit 22, a data dividing unit 23, a data CRC judging unit 24, a data assembling unit 25, a data output unit 26, and a header CRC judging unit 29.

The receiving unit 21 receives reception data (message) as shown in FIG. 1-3 from the communication line, and sends the reception data (message) to the division length judging unit 22. The division length judging unit 22 obtains a header and a header CRC from the reception data received from the receiving unit 21, and sends the header and the header CRC to the header CRC judging unit 29. The division length judging unit 22 also receives a judgment result from the header CRC judging unit 29, and only if the judgment result is OK (the check result is correct), obtains the division length from the header, and sends the reception data and the division length to the data dividing unit 23.

The header CRC judging unit 29 checks the header CRC based on the header received from the division length judging unit 22, by using a predetermined generator polynomial stored therein, and notifies the division length judging unit 22 of the judgment result. The judgment result is either NG (the check result is wrong) or OK (the check result is correct).

The data dividing unit 23 divides the reception data into segments whose length is obtained by adding the division length received from the division length judging unit 22 and the code length of a predetermined data CRC stored therein, and sends the whole, in other words, the divided data and the data CRC to the data CRC judging unit 24. The data dividing unit 23 also sends the divided data formed of data portions, to the data assembling unit 25.

The data CRC judging unit 24 checks the data CRC by using a predetermined generator polynomial stored therein, and notifies the data assembling unit 25 of the judgment result. The judgment result is either NG (the check result is wrong) or OK (the check result is correct).

The data assembling unit 25 receives the judgment result sent from the data CRC judging unit 24, and only if all the judgment results of the divided data segments are OK (the check result is correct), assembles the divided data, and sends the data to the data output unit 26. The data output unit 26 receives the data sent from the data assembling unit 25, and outputs the data to the application and the like running in the equipment B.

A reception process performed by the receiving apparatus R1 will be described with reference to FIG. 1-6. FIG. 1-6 is a flowchart for explaining a process performed by the receiving apparatus R1 according to the first embodiment. The receiving unit 21 of the receiving apparatus R1 receives reception data (message) from the communication line (Step S31), and sends the reception data (message) to the division length judging unit 22. The division length judging unit 22 obtains a header and a header CRC from the reception data received from the receiving unit 21, and sends the header and the header CRC to the header CRC judging unit 29.

The header CRC judging unit 29 checks the header CRC based on the header, by using a predetermined generator polynomial stored therein (Step S32), and notifies the division length judging unit 22 of the judgment result. The judgment result is either NG (the check result is wrong) or OK (the check result is correct).

Upon receiving the judgment result from the header CRC judging unit 29, and if the judgment result is NG (the check result is wrong) (NO at Step S32), the division length judging unit 22 determines that an error is detected in the reception data (Step S33), and finishes the series of processes. Upon receiving the judgment result from the header CRC judging unit 29, and if the judgment result is OK (the check result is correct) (YES at Step S32), the division length judging unit 22 obtains the division length from the header (Step S34), and sends the reception data and the division length to the data dividing unit 23.

The data dividing unit 23 divides the reception data into segments whose length is obtained by adding the division length received from the division length judging unit 22 and the code length of a predetermined data CRC, and reads the divided data (Step S35). The data dividing unit 23 then sends the divided data and the data CRC to the data CRC judging unit 24. The data dividing unit 23 also sends the divided data formed of data portions, to the data assembling unit 25.

The data CRC judging unit 24 checks the data CRC by using a predetermined generator polynomial (Step S36), and notifies the data assembling unit 25 of the judgment result. The judgment result is either NG (the check result is wrong) or OK (the check result is correct).

Upon receiving the judgment result from the data CRC judging unit 24, and if the judgment result is NG (the check result is wrong) (NO at Step S36), the data assembling unit 25 determines that an error is detected in the reception data (Step S33), and finishes the series of processes. Upon receiving the judgment result from the data CRC judging unit 24, and if the judgment result is OK (the check result is correct) (YES at Step S36), the data assembling unit 25 determines whether the data CRC of all the divided data segments has been checked (Step S37).

If the data assembling unit 25 determines that the data CRC of all the divided data segments has not been checked (NO at Step S37), the data assembling unit 25 sends information with which the check result is correct to the data CRC judging unit 24, and the process returns to Step S35. The data CRC judging unit 24 receives the information, and checks the CRC of the next divided data segment (Step S35). The processes from Step S35 to Step S37 are repeated until the data CRC of all the divided data segments has been checked.

If the data assembling unit 25 determines that the CRC calculations performed on all the divided data segments are correct, and that the data CRC of all the divided data segments has been checked (YES at Step S37), the data assembling unit 25 determines that the data is received properly (Step S38), assembles the divided data, and sends the data to the data output unit 26. The data output unit 26 receives the data sent from the data assembling unit 25, outputs the data to the application and the like running in the equipment B, and finishes the series of processes.

As described above, the transmitting apparatus T1 (communication system S1) according to the first embodiment can transmit messages, by dividing data so as to ensure the upper limit of the non-detection probability of message transmission errors per time. Accordingly, it is possible to perform communication while ensuring the desired reliability of correct communication, by restraining the transmission error non-detection probability of the message to equal to or less than a desired target value. Because unnecessary data division is not performed, it is possible to perform efficient communication.

In the aforementioned process, the transmission error non-detection probability judging unit 2 repeats calculation while changing the division length, until the calculated transmission error non-detection probability $\Lambda$ satisfies the reference value of the transmission error non-detection probability of the parameter. However, a division length that satisfies the reference value of the transmission error non-detection probability of the parameter may be directly calculated by modifying the above-described evaluation function (1).

The division length (the number of bits in a frame) that satisfies the reference value of the transmission error non-detection probability of the parameter may be calculated by an evaluation function $g(m, p, v, d, \Lambda)$. The evaluation function $g(m, p, v, d, \Lambda)$ can be derived by modifying the above-described evaluation function $f(m, p, v, d, n)$. In such an event, because a division length (the number of bits in a frame) corresponding to the reference value of the transmission error non-detection probability of the parameter is calculated, the division length equal to or less than the calculated division length may be adopted.

Second Embodiment

FIG. 2-1 is a diagram for explaining a configuration of a communication system according to a second embodiment of the present invention. A communication system S2 according to the second embodiment includes a transmitting apparatus T2 and a receiving apparatus R2 connected with the communication line C. In FIG. 2-1, one communication system S2 includes the transmitting apparatus T2 mounted on the equipment A for FA, and the receiving apparatus R2 mounted on the equipment B for FA. Another communication system S1 includes the transmitting apparatus T2 mounted on the equipment B and the receiving apparatus R2 mounted on the equipment A. Because the equipment A, the equipment B, and the like are the same as those in the first embodiment, the description in the first embodiment is applicable, and detailed description thereof is omitted here.

FIG. 2-2 is a block diagram for explaining a configuration of the transmitting apparatus T2 of the communication system S2 according to the second embodiment. The transmitting apparatus T2 includes the parameter input unit 1, the transmission error non-detection probability judging unit 2, the header and data input unit 3, a code length determining unit 9, the data dividing unit 5, the data CRC generating unit 6, the header CRC generating unit 11, the transmission data assembling unit 7, and the transmitting unit 8. The same components as those in the first embodiment are denoted by the same reference numerals as in the first embodiment.

The functions of the units will now be described. The parameter input unit 1 receives a parameter related to a transmission error non-detection probability of the message per time, before the transmitting apparatus T2 receives data to be transmitted. The parameter includes a reference value of the transmission error non-detection probability of the message per time, a probability of generating bit errors in a communication channel, a transmission rate of the communication channel, the number of messages (transmission data) per unit time, and the number of pieces of communication equipment being connected. The parameter input unit 1 sends the received parameter to the transmission error non-detection probability judging unit 2.

The transmitting apparatus T2 stores therein a code correspondence table 31 used in common with the receiving apparatus R2 in advance. FIG. 2-3 is a diagram illustrating an example of the code correspondence table 31. The code correspondence table 31 stores therein a list of code identification numbers, the code lengths, and CRC generator polynomials. Here, the code length is used as an identifier for a code.

The header and data input unit 3 receives data to be transmitted, for example, from an application running in the equipment A, after the parameter input unit 1 receives the parameter. The header and data input unit 3 sends the data length of the data to the code length determining unit 9, and sends a header and data to the data dividing unit 5. The code length determining unit 9 sets the code length of a standard generator polynomial (such as 16 bits) in the code correspondence table 31 as an initial value of the code length (initialization of code length), and sends the code length and the data length to the transmission error non-detection probability judging unit 2.

The transmission error non-detection probability judging unit 2 stores therein a predetermined evaluation function related to a transmission error non-detection probability, and calculates a transmission error non-detection probability Λ by using the evaluation function. The transmission error non-detection probability judging unit 2 also calculates other condition values required for communication. In the second embodiment, the transmission error non-detection probability Λ (probability that cannot detect transmission errors=error rate) is calculated, based on the data length and the code length received from the code length determining unit 9, the parameter received from the parameter input unit 1, and a division length. Here, a predetermined division length stored in the transmission error non-detection probability judging unit 2 is used.

The transmission error non-detection probability judging unit 2 determines whether the calculated transmission error non-detection probability Λ satisfies a reference value of the transmission error non-detection probability of the parameter (whether equal or less than the reference value of the transmission error non-detection probability), and notifies the code length determining unit 9 of the judgment result. The judgment result is either NG (the calculated transmission error non-detection probability Λ is higher than the reference value of the transmission error non-detection probability) or OK (the calculated transmission error non-detection probability Λ is equal to or less than the reference value of the transmission error non-detection probability).

Upon receiving the judgment result from the transmission error non-detection probability judging unit 2, and if the judgment result is NG (the calculated transmission error non-detection probability Λ does not satisfy the reference value of the transmission error non-detection probability (higher than the reference value of the transmission error non-detection probability)), the code length determining unit 9 increases the code length by selecting a longer generator polynomial from the code correspondence table 31, and notifies the transmission error non-detection probability judging unit 2 of the data length and the code length again. Upon receiving the judgment result from the transmission error non-detection probability judging unit 2, and if the judgment result is OK (the calculated transmission error non-detection probability Λ satisfies the reference value of the transmission error non-detection probability (the calculated transmission error non-detection probability Λ is equal to or less than the reference value of the transmission error non-detection probability)), the code length determining unit 9 sends the code length to the data dividing unit 5.

The data dividing unit 5 stores the code length received from the code length determining unit 9 in the header received from the header and data input unit 3, and sends the header to the header CRC generating unit 11 and the transmission data assembling unit 7. Based on a predetermined division length stored therein, the data dividing unit 5 divides the data received from the header and data input unit 3, and sends the code length and the divided data to the data CRC generating unit 6 and the divided data to the transmission data assembling unit 7.

The data CRC generating unit 6 generates a data CRC based on the code length and the divided data received from the data dividing unit 5, by using a generator polynomial corresponding to the code length by referring to the code correspondence table 31, and sends the data CRC to the transmission data assembling unit 7. The header CRC generating unit 11 generates a header CRC based on the header received from the data dividing unit 5, by calculating the header CRC using a predetermined CRC generator polynomial stored therein, and sends the header CRC to the transmission data assembling unit 7.

The transmission data assembling unit 7 assembles transmission data (message) with the header and the divided data received from the data dividing unit 5, the header CRC received from the header CRC generating unit 11, and the data CRC received from the data CRC generating unit 6, and sends the transmission data (message) to the transmitting unit 8.

The transmitting unit 8 transmits the transmission data (message) received from the transmission data assembling unit 7 to the communication line C. A configurational example of an image of the transmission data (message) being assembled is illustrated in FIG. 1-3.

Figures 1, 2, 3, 4:
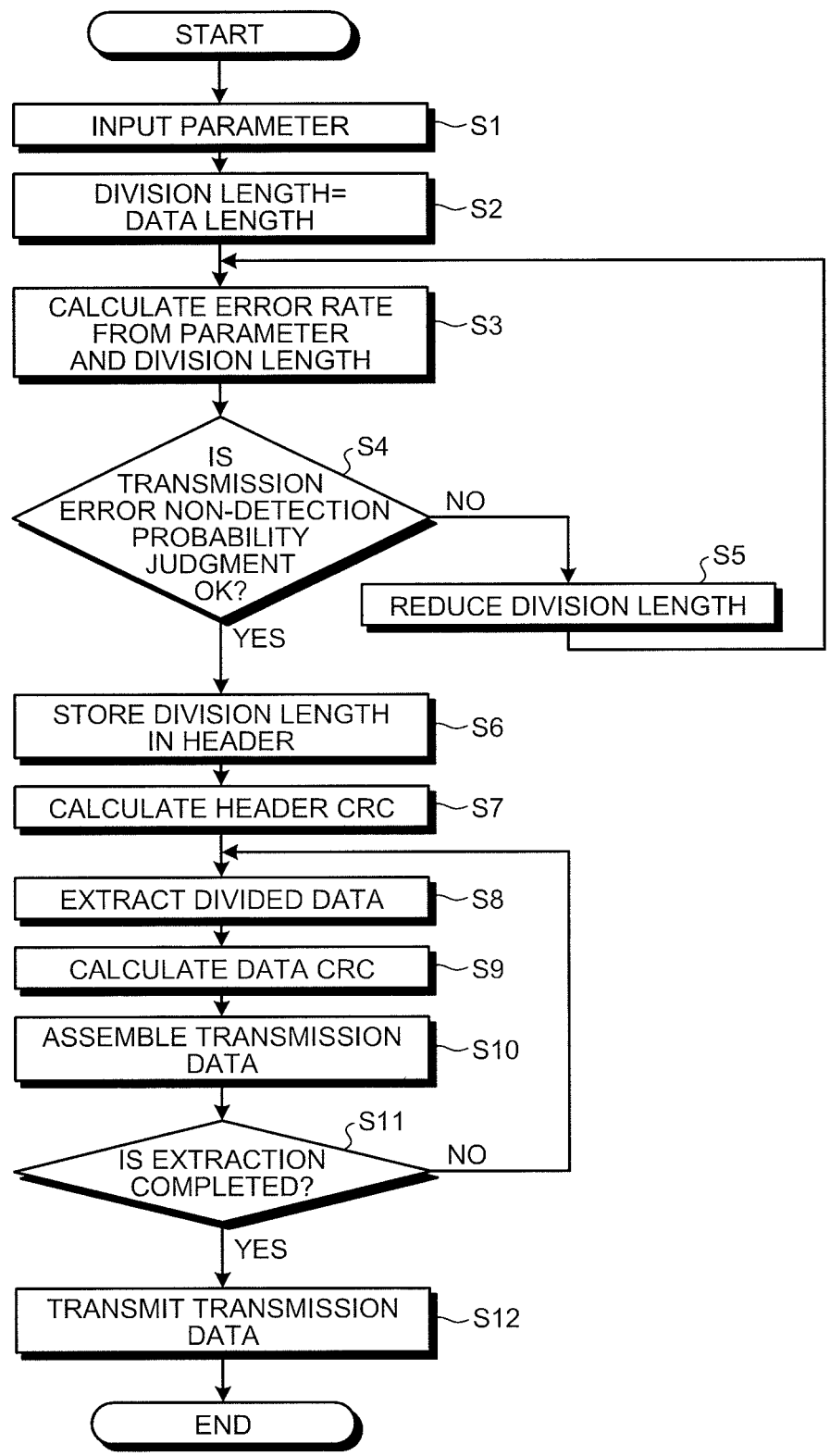

A transmission process performed by the transmitting apparatus T2 will be described with reference to FIG. 2-4. FIG. 2-4 is a flowchart for explaining a process performed by the transmitting apparatus T2 according to the second embodiment. The parameter input unit 1 receives a parameter (Step S1). For example, a calculator such as a personal computer is connected to the transmitting apparatus T2, and the parameter input unit 1 receives the parameter from the personal computer and the like. The parameter input unit 1 sends the received parameter to the transmission error non-detection probability judging unit 2.

The header and data input unit 3 receives data to be transmitted to the receiving apparatus R2, for example, from an application running in the equipment A, after the parameter input unit 1 receives the parameter. The header and data input unit 3 then sends the data length of the data to the code length determining unit 9, and sends a header and data to the data dividing unit 5.

The code length determining unit 9 sets the code length of a standard generator polynomial (such as 16 bits) in the code correspondence table 31 as an initial value of the code length (initialization of code length), and sends the code length and the data length to the transmission error non-detection probability judging unit 2 (Step S13).

The transmission error non-detection probability judging unit 2 calculates a transmission error non-detection probability (error rate) $\Lambda$, based on the data length and the code length received from the code length determining unit 9, the parameter received from the parameter input unit 1, and a division length (Step S14). Here, a predetermined division length stored in the transmission error non-detection probability judging unit 2 is used.

The transmission error non-detection probability judging unit 2 determines whether the calculated transmission error non-detection probability $\Lambda$ satisfies the reference value of the transmission error non-detection probability of the parameter (Step S4), and notifies the code length determining unit 9 of the judgment result. The judgment result of either NG (the calculated transmission error non-detection probability $\Lambda$ is higher than the reference value of the transmission error non-detection probability) or OK (the calculated transmission error non-detection probability $\Lambda$ is equal to or less than the reference value of the transmission error non-detection probability) is notified.

If the received judgment result is NG (NO at Step S4), the code length determining unit 9 increases the code length by selecting a longer generator polynomial from the code correspondence table 31, notifies the transmission error non-detection probability judging unit 2 of the data length and the increased code length again (Step S15), and starts again from Step S13. If the received judgment result is OK (YES at Step S4), the code length determining unit 9 adopts the code length at this time, and sends the code length to the data dividing unit 5.

The data dividing unit 5 stores the code length received from the code length determining unit 9 in the header received from the header and data input unit 3 and in which information such as an address of a message is included (Step S16). The data dividing unit 5 then sends the header to the header CRC generating unit 11 and the transmission data assembling unit 7. The header CRC generating unit 11 generates a header CRC based on the header received from the data dividing unit 5, by using a predetermined CRC generator polynomial stored therein (Step S7), and sends the header CRC to the transmission data assembling unit 7.

The data dividing unit 5, based on a predetermined division length stored therein, divides the data received from the header and data input unit 3 into segments and extracts the divided data segments (Step S8). The data dividing unit 5 then sends the code length and the divided data to the data CRC generating unit 6, and sends the divided data to the transmission data assembling unit 7. The data CRC generating unit 6 generates a data CRC based on the code length and the divided data received from the data dividing unit 5, by calculating the data CRC using a generator polynomial corresponding to the code length by referring to the code correspondence table 31 (Step S9), and sends the data CRC to the transmission data assembling unit 7.

The transmission data assembling unit 7 assembles transmission data (message) with the header and the divided data received from the data dividing unit 5, the header CRC received from the header CRC generating unit 11, and the data CRC received from the data CRC generating unit 6 (Step S10). The transmission data assembling unit 7 then determines whether the extraction (assembly) of the divided data received from the data dividing unit 5 is completed (Step S11).

If the transmission data assembling unit 7 determines that the extraction is not yet completed (NO at Step S11), the process returns to Step S8, and the process is repeated until the extraction is completed. If the transmission data assembling unit 7 determines that the extraction is completed (YES at Step S11), the transmission data assembling unit 7 sends the transmission data (message) to the transmitting unit 8. The transmitting unit 8 transmits the transmission data (message) received from the transmission data assembling unit 7 to the communication line C, and finishes the series of processes (Step S 12). The transmission data (message) transmitted from the transmitting apparatus T2 is sent to the receiving apparatus R2 through the communication line C.

Every time the transmitting apparatus T2 receives data from the application running in the equipment A, the process is repeated from Step S1 to Step S12. However, when the same parameters are used, the process at Step S1 may be omitted in the second and subsequent processes.

FIG. 2-5 is a block diagram for explaining a configuration of the receiving apparatus R2 of the communication system S2 according to the second embodiment. The receiving apparatus R2 includes the receiving unit 21, a code length judging unit 27, the data dividing unit 23, the data CRC judging unit 24, the data assembling unit 25, the data output unit 26, and the header CRC judging unit 29.

The receiving apparatus R2 stores therein the code correspondence table 31 used in common with the transmitting apparatus T2 in advance. The code correspondence table 31 stores therein a list of code identification numbers, the code lengths, and CRC generator polynomials. Here, the code length is used as an identifier for a code.

The receiving unit 21 receives reception data (message) as shown in FIG. 1-3 from the communication line, and sends the reception data (message) to the code length judging unit 27. The code length judging unit 27 obtains a header and a header CRC from the reception data received from the receiving unit 21, and sends the header and the header CRC to the header CRC judging unit 29. The code length judging unit 27 receives the judgment result from the header CRC judging unit 29, and only if the judgment result is OK (the check result is correct), obtains a code length from the header, and sends the reception data and the code length to the data dividing unit 23.

The header CRC judging unit 29 checks the header CRC based on the header received from the code length judging unit 27, by using a predetermined generator polynomial stored therein, and notifies the code length judging unit 27 of the judgment result. The judgment result is either NG (the check result is wrong) or OK (the check result is correct).

The data dividing unit 23 divides the reception data into segments whose length is obtained by adding a predetermined division length stored therein and the code length received from the code length judging unit 27, and sends the whole, in other words, the divided data, the data CRC, and the code length to the data CRC judging unit 24. The data dividing unit 23 also sends the divided data formed of data portions, to the data assembling unit 25.

The data CRC judging unit 24 checks the data CRC based on the code length and the divided data received from the data dividing unit 23, by using a generator polynomial corresponding to the code length by referring to the code correspondence table 31, and notifies the data assembling unit 25 of the judgment result. The judgment result is either NG (the check result is wrong) or OK (the check result is correct).

The data assembling unit 25 receives the judgment result sent from the data CRC judging unit 24, and only if all the judgment results of the divided data segments are OK (the check result is correct), assembles the divided data, and sends the data to the data output unit 26. The data output unit 26 receives the data sent from the data assembling unit 25, and outputs the data to the application and the like running in the equipment B.

A reception process performed by the receiving apparatus R2 will be described with reference to FIG. 2-6. FIG. 2-6 is a flowchart for explaining a process performed by the receiving apparatus R2 according to the second embodiment. The receiving unit 21 of the receiving apparatus R2 receives reception data (message) from the communication line (Step S31), and sends the reception data (message) to the code length judging unit 27. The code length judging unit 27 obtains a header and a header CRC from the reception data received from the receiving unit 21, and sends the header and the header CRC to the header CRC judging unit 29.

The header CRC judging unit 29 checks the header CRC based on the header received from the code length judging unit 27, by using a predetermined generator polynomial stored therein, (Step S32), and notifies the code length judging unit 27 of the judgment result. The judgment result is either NG (the check result is wrong) or OK (the check result is correct).

Upon receiving the judgment result from the header CRC judging unit 29, and if the judgment result is NG (the check result is wrong) (NO at Step S32), the code length judging unit 27 determines that an error is detected in the reception data (Step S33), and finishes the series of processes. Upon receiving the judgment result from the header CRC judging unit 29, and if the judgment result is OK (the check result is correct) (YES at Step S32), the code length judging unit 27 obtains the code length from the header (Step S39), and sends the reception data and the code length to the data dividing unit 23.

The data dividing unit 23 divides the reception data into segments whose length is obtained by adding a predetermined division length stored therein and the code length received from the code length judging unit 27, and reads the divided data (Step S35). The data dividing unit 23 then sends the divided data, the data CRC, and the code length to the data CRC judging unit 24. The data dividing unit 23 also sends the divided data formed of data portions, to the data assembling unit 25.

The data CRC judging unit 24 checks the CRC of the divided data based on the code length and the divided data received from the data dividing unit 23, by using a generator polynomial corresponding to the code length obtained from the header by referring to the code correspondence table 31 (Step S36), and notifies the data assembling unit 25 of the judgment result. The judgment result is either NG (the check result is wrong) or OK (the check result is correct).

Upon receiving the judgment result from the data CRC judging unit 24, and if the judgment result is NG (the check result is wrong) (NO at Step S36), the data assembling unit 25 determines that an error is detected in the reception data (Step S33), and finishes the series of processes. Upon receiving the judgment result from the data CRC judging unit 24, and if the judgment result is OK (the check result is correct) (YES at Step S36), the data assembling unit 25 determines whether the data CRC of all the divided data segments has been checked (Step S37).

If the data assembling unit 25 determines that the data CRC of all the divided data segments has not been checked (NO at Step S37), the data assembling unit 25 sends information with which the check result is correct to the data CRC judging unit 24, and the process returns to Step S35. The data CRC judging unit 24 receives the information, and checks the CRC of the next divided data segment (Step S35). The processes from Step S35 to Step S37 are repeated until the data CRC of all the divided data segments has been checked If the data assembling unit 25 determines that the CRC calculations performed on all the divided data segments are correct, and that the data CRC of all the divided data segments has been checked (YES at Step S37), the data assembling unit 25 determines that the data is received properly (Step S38), assembles the divided data, and sends the data to the data output unit 26. The data output unit 26 receives the data sent from the data assembling unit 25, and outputs the data to the application and the like running in the equipment B, and finishes the series of processes.

As described above, the transmitting apparatus T2 (communication system S2) according to the second embodiment can transmit messages while adding the data CRC to the message, so as to ensure the upper limit of the non-detection probability of message transmission errors per time. Accordingly, it is possible to perform communication while ensuring the desired reliability of correct communication, by restraining the transmission error non-detection probability of the message to equal to or less than a desired target value. Because unnecessary coding is not performed, it is possible to perform efficient communication.

In the aforementioned process, the transmission error non-detection probability judging unit 2 repeats calculation while changing the code length, until the calculated transmission error non-detection probability $\Lambda$ satisfies the reference value of the transmission error non-detection probability of the parameter. However, a code length that satisfies the reference value of the transmission error non-detection probability of the parameter (d: a characteristic value of an error detection code) may be directly calculated by modifying the above-described evaluation function (1).

The code length that satisfies the reference value of the transmission error non-detection probability of the parameter may be calculated by an evaluation function $h(m, p, v, n, \Lambda)$. The evaluation function $h(m, p, v, n, \Lambda)$ can be derived by modifying the above-described evaluation function $f(m, p, v, d, n)$. In such an event, because a code length corresponding to the reference value of the transmission error non-detection probability of the parameter is calculated, the code length equal to or more than the calculated code length may be adopted.

Third Embodiment

FIG. 3-1 is a diagram for explaining a configuration of a communication system according to a third embodiment of the present invention. A communication system S3 according to the third embodiment includes a transmitting apparatus T3 and a receiving apparatus R3 connected with the communication line C. In FIG. 3-1, one communication system S3 includes the transmitting apparatus T3 mounted on the equipment A for FA, and the receiving apparatus R3 mounted on the equipment B for FA. Another communication system S3 includes the transmitting apparatus T3 mounted on the equipment B and the receiving apparatus R3 mounted on the equipment A. Because the equipment A, the equipment B, and the like are the same as those in the first embodiment, the description in the first embodiment is applicable, and detailed description thereof is omitted here.

FIG. 3-2 is a block diagram for explaining a configuration of the transmitting apparatus T3 of the communication system S3 according to the third embodiment. The transmitting apparatus T3 includes the parameter input unit 1, the transmission error non-detection probability judging unit 2, the header and data input unit 3, a division length and code length determining unit 10, the data dividing unit 5, the data CRC generating unit 6, the header CRC generating unit 11, the transmission data assembling unit 7, and the transmitting unit 8. The same components as those in the first embodiment are denoted by the same reference numerals as in the first embodiment.

The functions of the units will now be described. The parameter input unit 1 receives a parameter related to a transmission error non-detection probability of the message per time, before the transmitting apparatus T3 receives data to be transmitted. The parameter includes a reference value of the transmission error non-detection probability of the message per time, a probability of generating bit errors in a communication channel, a transmission rate of the communication channel, the number of messages (transmission data) per unit time, and the number of pieces of communication equipment being connected. The parameter input unit 1 sends the received parameter to the transmission error non-detection probability judging unit 2.

The transmitting apparatus T3 stores therein the code correspondence table 31 used in common with the receiving apparatus R3 in advance (see FIG. 2-3). The code correspondence table 31 stores therein a list of code identification numbers, the code lengths, and CRC generator polynomials. Here, the code length is used as an identifier for a code.

The header and data input unit 3 receives data to be transmitted, for example, from an application running in the equipment A, after the parameter input unit 1 receives the parameter. The header and data input unit 3 then sends the data length of the data to the division length and code length determining unit 10, and sends a header and data to the data dividing unit 5. The division length and code length determining unit 10 sets the data length received from the header and data input unit 3 as an initial value of the division length (initialization of division length), and sets the code length of a standard generator polynomial (such as 16 bits) in the code correspondence table 31 as an initial value of the code length (initialization of code length). The division length and code length determining unit 10 then sends the division length, the code length, and the data length to the transmission error non-detection probability judging unit 2.

The transmission error non-detection probability judging unit 2 stores therein a predetermined evaluation function related to a transmission error non-detection probability, and calculates a transmission error non-detection probability $\Lambda$ by using the evaluation function. The transmission error non-detection probability judging unit 2 also calculates other condition values required for communication. In the third embodiment, the transmission error non-detection probability judging unit 2 calculates a transmission error non-detection probability (probability that cannot detect transmission errors=error rate) $\Lambda$, based on the data length and the code length received from the division length and code length determining unit 10, the parameter received from the parameter input unit 1, and the division length received from the division length and code length determining unit 10.

The transmission error non-detection probability judging unit 2 determines whether the calculated transmission error non-detection probability $\Lambda$ satisfies the reference value of the transmission error non-detection probability of the parameter (whether equal or less than the reference value of the transmission error non-detection probability), and notifies the division length and code length determining unit 10 of the judgment result. The judgment result is either NG (the calculated transmission error non-detection probability $\Lambda$ is higher than the reference value of the transmission error non-detection probability) or OK (the calculated transmission error non-detection probability $\Lambda$ is equal to or less than the reference value of the transmission error non-detection probability).

Upon receiving the judgment result from the transmission error non-detection probability judging unit 2, and if the judgment result is NG (the calculated transmission error non-detection probability $\Lambda$ does not satisfy the reference value of the transmission error non-detection probability (higher than the reference value of the transmission error non-detection probability)), the division length and code length determining unit 10 reduces the division length or increases the code length by selecting a longer generator polynomial from the code correspondence table 31, and notifies the transmission error non-detection probability judging unit 2 of the data length, the division length, and the code length again. Upon receiving the judgment result from the transmission error non-detection probability judging unit 2, and if the judgment result is OK (the calculated transmission error non-detection probability $\Lambda$ satisfies the reference value of the transmission error non-detection probability (the calculated transmission error non-detection probability $\Lambda$ is equal to or less than the reference value of the transmission error non-detection probability)), the division length and code length determining unit 10 sends the division length and the code length to the data dividing unit 5.

The data dividing unit 5 stores the division length and the code length received from the division length and code length determining unit 10 in the header received from the header and data input unit 3, and sends the header to the header CRC generating unit 11 and the transmission data assembling unit 7. Based on the division length received from the division length and code length determining unit 10, the data dividing unit 5 divides the data received from the header and data input unit 3, and sends the code length and the divided data to the data CRC generating unit 6, and the divided data to the transmission data assembling unit 7.

The data CRC generating unit 6 generates a data CRC based on the code length and the divided data received from the data dividing unit 5, by using a generator polynomial corresponding to the code length by referring to the code correspondence table 31, and sends the data CRC to the transmission data assembling unit 7. The header CRC generating unit 11 generates a header CRC based on the header received from the data dividing unit 5, by calculating the header CRC using a predetermined CRC generator polynomial stored therein, and sends the header CRC to the transmission data assembling unit 7.

The transmission data assembling unit 7 assembles transmission data (message) with the header and the divided data received from the data dividing unit 5, the header CRC received from the header CRC generating unit 11, and the data CRC received from the data CRC generating unit 6, and sends the transmission data (message) to the transmitting unit 8.

The transmitting unit 8 transmits the transmission data (message) received from the transmission data assembling unit 7 to the communication line C. FIG. 1-3 is the schematic of an image of the transmission data (message) being assembled.

A transmission process performed by the transmitting apparatus T3 will now be described with reference to FIG. 3-3. FIG. 3-3 is a flowchart for explaining a process performed by the transmitting apparatus T3 according to the third embodiment. The parameter input unit 1 receives a parameter (Step S1). For example, a calculator such as a personal computer is connected to the transmitting apparatus T3, and the parameter input unit 1 receives the parameter from the personal computer and the like. The parameter input unit 1 sends the received parameter to the transmission error non-detection probability judging unit 2.

The header and data input unit 3 receives data to be transmitted to the receiving apparatus R3, for example, from an application running in the equipment A, after the parameter input unit 1 receives the parameter. The header and data input unit 3 then sends the data length of the data to the division length and code length determining unit 10, and sends a header and data to the data dividing unit 5.

Upon receiving the data length from the header and data input unit 3, the division length and code length determining unit 10 sets (initializes) the received data length as an initial value of the division length, and sets the code length of a standard generator polynomial (such as 16 bits) in the code correspondence table 31 as an initial value of the code length (initialization of code length) (Step S17). The division length and code length determining unit 10 then sends the division length, the code length, and the data length to the transmission error non-detection probability judging unit 2.

The transmission error non-detection probability judging unit 2 calculates a transmission error non-detection probability (error rate) Λ, based on the data length and the code length received from the division length and code length determining unit 10, the parameter received from the parameter input unit 1, and the division length (Step S18).

The transmission error non-detection probability judging unit 2 determines whether the calculated transmission error non-detection probability Λ satisfies the reference value of the transmission error non-detection probability of the parameter (Step S4), and notifies the division length and code length determining unit 10 of the judgment result. The judgment result of either NG (the calculated transmission error non-detection probability Λ is higher than the reference value of the transmission error non-detection probability) or OK (the calculated transmission error non-detection probability Λ is equal to or less than the reference value of the transmission error non-detection probability) is notified.

If the received judgment result is NG (NO at Step S4), the division length and code length determining unit 10 either reduces the division length, or increases the code length by selecting a longer generator polynomial from the code correspondence table 31, notifies the transmission error non-detection probability judging unit 2 of the data length, the division length, and the code length again (Step S19), and starts again from Step S18. If the received judgment result is OK (YES at Step S4), the division length and code length determining unit 10 adopts the division length and the code length at this time, and sends the division length and the code length to the data dividing unit 5.

The data dividing unit 5 stores the division length and the code length received from the division length and code length determining unit 10 in the header received from the header and data input unit 3 and in which information such as an address of a message is included (Step S20). The data dividing unit 5 then sends the header to the header CRC generating unit 11 and the transmission data assembling unit 7. The header CRC generating unit 11 generates a header CRC based on the header received from the data dividing unit 5, by using a predetermined CRC generator polynomial stored therein (Step S7), and sends the header CRC to the transmission data assembling unit 7.

The data dividing unit 5, based on the division length received from the division length and code length determining unit 10, divides the data received from the header and data input unit 3 into segments and extracts the divided data segments (Step S8). The data dividing unit 5 then sends the code length and the divided data to the data CRC generating unit 6, and sends the divided data to the transmission data assembling unit 7. The data CRC generating unit 6 generates a data CRC based on the code length and the divided data received from the data dividing unit 5, by calculating the data CRC using a generator polynomial corresponding to the code length by referring to the code correspondence table 31 (Step S9), and sends the data CRC to the transmission data assembling unit 7.

The transmission data assembling unit 7 assembles transmission data (message) with the header and the divided data received from the data dividing unit 5, the header CRC received from the header CRC generating unit 11, and the data CRC received from the data CRC generating unit 6 (Step S10). The transmission data assembling unit 7 then determines whether the extraction (assembly) of the divided data received from the data dividing unit 5 is completed (Step S11).

If the transmission data assembling unit 7 determines that the extraction is not yet completed (NO at Step S11), the process returns to Step S8 and the process is repeated until the extraction is completed. If the transmission data assembling unit 7 determines that the extraction is completed (YES at Step S11), the transmission data assembling unit 7 sends the transmission data (message) to the transmitting unit 8. The transmitting unit 8 transmits the transmission data (message) received from the transmission data assembling unit 7 to the communication line C, and finishes the series of processes (Step S12). The transmission data (message) transmitted from the transmitting apparatus T3 is sent to the receiving apparatus R3 through the communication line C.

Every time the transmitting apparatus T3 receives data from the application running in the equipment A, the process is repeated from Step S1 to Step S12. However, when the same parameters are used, the process at Step S1 may be omitted in the second and subsequent processes.

FIG. 3-4 is a block diagram for explaining a configuration of the receiving apparatus R3 of the communication system S3 according to the third embodiment. The receiving apparatus R3 includes the receiving unit 21, a division length and code length judging unit 28, the data dividing unit 23, the data CRC judging unit 24, the data assembling unit 25, the data output unit 26, and the header CRC judging unit 29.

The receiving apparatus R3 stores therein the code correspondence table 31 used in common with the transmitting apparatus T3 in advance. The code correspondence table 31 stores therein a list of code identification numbers, the code lengths, and CRC generator polynomials. Here, the code length is used as an identifier for a code.

The receiving unit 21 receives reception data (message) as shown in FIG. 1-3 from the communication line, and sends the reception data (message) to the division length and code length judging unit 28. The division length and code length judging unit 28 obtains a header and a header CRC from the reception data received from the receiving unit 21, and sends the header and the header CRC to the header CRC judging unit 29. The division length and code length judging unit 28 receives the judgment result from the header CRC judging unit 29, and only if the judgment result is OK (the check result is correct), obtains the division length and the code length from the header, and sends the division length, the code length, and the reception data to the data dividing unit 23.

The header CRC judging unit 29 checks the header CRC based on the header received from the division length and code length judging unit 28, by using a predetermined generator polynomial stored therein, and notifies the division length and code length judging unit 28 of the judgment result. The judgment result is either NG (the check result is wrong) or OK (the check result is correct).

The data dividing unit 23 divides the reception data into segments whose length is obtained by adding the division length and the code length received from the division length and code length judging unit 28, and sends the whole, in other words, the divided data, the data CRC, and the code length to the data CRC judging unit 24. The data dividing unit 23 also sends the divided data formed of data portions, to the data assembling unit 25.

The data CRC judging unit 24 checks the data CRC based on the code length and the divided data received from the data dividing unit 23, by using a generator polynomial corresponding to the code length by referring to the code correspondence table 31, and notifies the data assembling unit 25 of the judgment result. The judgment result is either NG (the check result is wrong) or OK (the check result is correct).

The data assembling unit 25 receives the judgment result sent from the data CRC judging unit 24, and only if all the judgment results of the divided data segments are OK (the check result is correct), assembles the divided data, and sends the data to the data output unit 26. The data output unit 26 receives the data sent from the data assembling unit 25, and outputs the data to the application and the like running in the equipment B.

Figures 1, 2, 3, 4, 5:
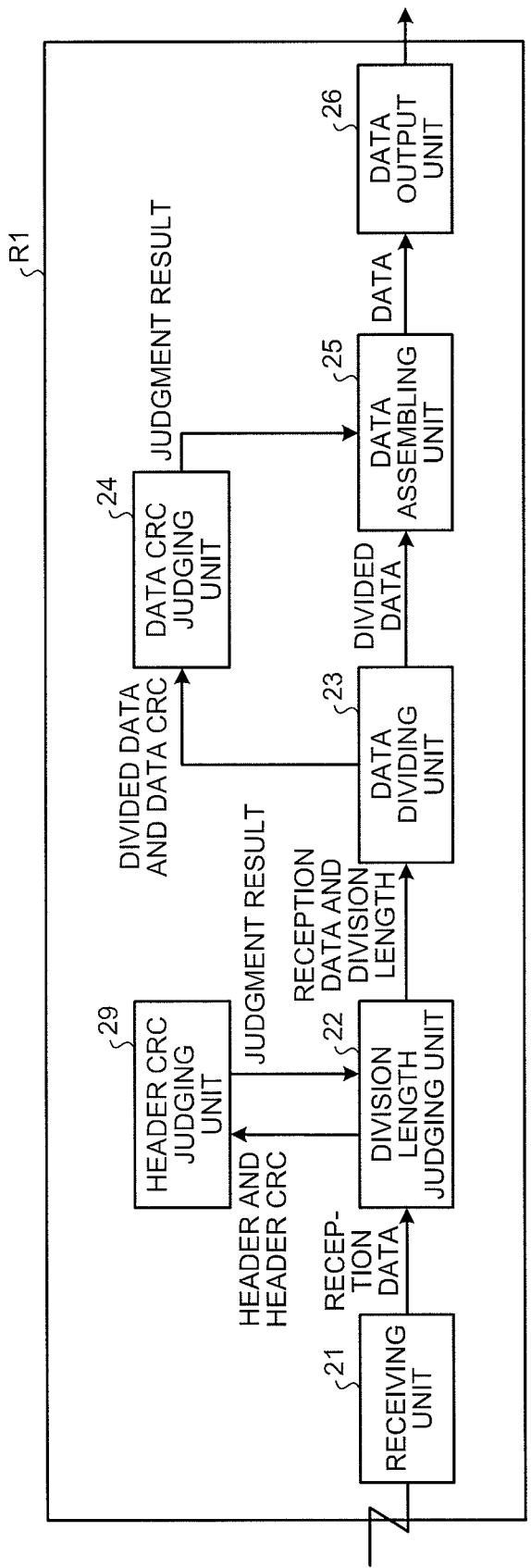

A reception process performed by the receiving apparatus R3 will be described with reference to FIG. 3-5. FIG. 3-5 is a flowchart for explaining a process performed by the receiving apparatus R3 according to the third embodiment. The receiving unit 21 of the receiving apparatus R3 receives reception data (message) from the communication line (Step S31), and sends the reception data (message) to the division length and code length judging unit 28. The division length and code length judging unit 28 obtains a header and a header CRC from the reception data received from the receiving unit 21, and sends the header and the header CRC to the header CRC judging unit 29.

The header CRC judging unit 29 checks the header CRC based on the header received from the division length and code length judging unit 28, by using a predetermined generator polynomial stored therein, (Step S32), and notifies the division length and code length judging unit 28 of the judgment result. The judgment result is either NG (the check result is wrong) or OK (the check result is correct).

Upon receiving the judgment result from the header CRC judging unit 29, and if the judgment result is NG (the check result is wrong) (NO at Step S32), the division length and code length judging unit 28 determines that an error is detected in the reception data (Step S33), and finishes the series of processes. Upon receiving the judgment result from the header CRC judging unit 29, and if the judgment result is OK (the check result is correct) (YES at Step S32), the division length and code length judging unit 28 obtains the division length and the code length from the header (Step S40), and sends the reception data, the division length, and the code length to the data dividing unit 23.

The data dividing unit 23 divides the reception data into segments whose length is obtained by adding the division length and the code length received from the division length and code length judging unit 28, and reads the divided data (Step S35). The data dividing unit 23 then sends the divided data, the data CRC, and the code length to the data CRC judging unit 24. The data dividing unit 23 also sends the divided data formed of data portions, to the data assembling unit 25.

The data CRC judging unit 24 checks the CRC of the divided data based on the code length and the divided data received from the data dividing unit 23, by using a generator polynomial corresponding to the code length obtained from the header by referring to the code correspondence table 31 (Step S36), and notifies the data assembling unit 25 of the judgment result. The judgment result is either NG (the check result is wrong) or OK (the check result is correct).

Upon receiving the judgment result from the data CRC judging unit 24, and if the judgment result is NG (the check result is wrong) (NO at Step S36), the data assembling unit 25 determines that an error is detected in the reception data (Step S33), and finishes the series of processes. Upon receiving the judgment result from the data CRC judging unit 24, and if the judgment result is OK (the check result is correct) (YES at Step S36), the data assembling unit 25 determines whether the data CRC of all the divided data segments has been checked (Step S37).

If the data assembling unit 25 determines that the data CRC of all the divided data segments has not been checked (NO at Step S37), the data assembling unit 25 sends information with which the check result is correct to the data CRC judging unit 24, and the process returns to Step S35. The data CRC judging unit 24 receives the information, and checks the CRC of the next divided data segment (Step S35). The processes from Step S35 to Step S37 are repeated until the data CRC of all the divided data segments has been checked.

If the data assembling unit 25 determines that the CRC calculations performed on all the divided data segments are correct, and that the data CRC of all the divided data segments has been checked (YES at Step S37), the data assembling unit 25 determines that the data is received properly (Step S38), assembles the divided data, and sends the data to the data output unit 26. The data output unit 26 receives the data sent from the data assembling unit 25, outputs the data to the application and the like running in the equipment B, and finishes the series of processes.

As described above, the transmitting apparatus T3 (communication system S3) according to the third embodiment can transmit messages by dividing data so as to ensure the upper limit of the non-detection probability of message transmission errors per time, while adding the data CRC to the message. Accordingly, it is possible to perform communication while ensuring the desired reliability of correct communication, by restraining the transmission error non-detection probability of the message to equal to or less than a desired target value. Because unnecessary data division and coding are not performed, it is possible to perform efficient communication.

In the aforementioned process, the transmission error non-detection probability judging unit 2 repeats calculation while changing the division length or the code length, until the calculated transmission error non-detection probability $\Lambda$ satisfies the reference value of the transmission error non-detection probability of the parameter. However, a division length that satisfies the reference value of the transmission error non-detection probability may be directly calculated, by using the above-described evaluation function $g(m, p, v, d, \Lambda)$ and the evaluation function $h(m, p, v, n, \Lambda)$.

Fourth Embodiment

FIG. 4-1 is a diagram for explaining a configuration of a communication system according to a fourth embodiment of the present invention. A communication system S4 according to the fourth embodiment includes a transmitting apparatus T4 and a receiving apparatus R4 connected with the communication line C. In FIG. 4-1, one communication system S4 includes the transmitting apparatus T4 mounted on the equipment A for FA, and the receiving apparatus R4 mounted on the equipment B for FA. Another communication system S4 includes the transmitting apparatus T4 mounted on the equipment B and the receiving apparatus R4 mounted on the equipment A. Because the equipment A, the equipment B, and the like are the same as those in the first embodiment, the description in the first embodiment is applicable, and detailed description thereof is omitted here.

FIG. 4-2 is a block diagram for explaining a configuration of the transmitting apparatus T4 of the communication system S4 according to the fourth embodiment. The transmitting apparatus T4 includes the parameter input unit 1, the transmission error non-detection probability judging unit 2, the header and data input unit 3, the data dividing unit 5, the data CRC generating unit 6, the header CRC generating unit 11, the transmission data assembling unit 7, and the transmitting unit 8. The same components as those in the first embodiment are denoted by the same reference numerals as in the first embodiment.

The functions of the units will now be described. The parameter input unit 1 receives a parameter related to a transmission error non-detection probability of the message per time, before the transmitting apparatus T4 receives data to be transmitted. The parameter includes a reference value of the transmission error non-detection probability of the message per time, a probability of generating bit errors in a communication channel, a transmission rate of the communication channel, and the number of pieces of communication equipment being connected. The parameter input unit 1 sends the received parameter to the transmission error non-detection probability judging unit 2.

The header and data input unit 3 receives data to be transmitted, for example, from an application running in the equipment A, after the parameter input unit 1 receives the parameter. The header and data input unit 3 then sends the data length of the data to the transmission error non-detection probability judging unit 2, and sends a header and data to the data dividing unit 5.

The transmission error non-detection probability judging unit 2 stores therein a predetermined evaluation function related to a transmission error non-detection probability, and calculates a transmission error non-detection probability $\Lambda$ by using the evaluation function. The transmission error non-detection probability judging unit 2 also calculates other condition values required for communication. In the fourth embodiment, the transmission error non-detection probability judging unit 2 calculates the time interval (transmission interval) so as to achieve the reference value of the transmission error non-detection probability, in other words, the reciprocal of the number of messages per time, by using an evaluation function obtained by modifying the evaluation function (1), based on the parameter received from the parameter input unit 1, a predetermined CRC code length (generator polynomial), and a predetermined division length. The transmission error non-detection probability judging unit 2 notifies the transmitting unit 8 of the calculated transmission interval.

The data dividing unit 5 sends the header received from the header and data input unit 3 to the header CRC generating unit 11 and the transmission data assembling unit 7. The data dividing unit 5 also divides the data received from the header and data input unit 3 based on a predetermined division length, and sends the divided data to the data CRC generating unit 6 and the transmission data assembling unit 7.

The data CRC generating unit 6 generates a data CRC from the divided data received from the data dividing unit 5, by calculating the data CRC using a predetermined CRC generator polynomial stored therein, and sends the data CRC to the transmission data assembling unit 7. The header CRC generating unit 11 generates a header CRC based on the header received from the data dividing unit 5, by calculating the header CRC using a predetermined CRC generator polynomial stored therein, and sends the header CRC to the transmission data assembling unit 7.

The transmission data assembling unit 7 assembles transmission data (message) with the header and the divided data received from the data dividing unit 5, the header CRC received from the header CRC generating unit 11, and the data CRC received from the data CRC generating unit 6, and sends the transmission data (message) to the transmitting unit 8.

The transmitting unit 8 transmits the transmission data (message) received from the transmission data assembling unit 7 to the communication line C. An example of an image of the transmission data (message) being assembled is illustrated in FIG. 1-3.

A transmission process performed by the transmitting apparatus T4 will be described with reference to FIG. 4-3. FIG. 4-3 is a flowchart for explaining a process performed by the transmitting apparatus T4 according to the fourth embodiment. The parameter input unit 1 receives a parameter (Step S1). For example, a calculator such as a personal computer is connected to the transmitting apparatus T4, and the parameter input unit 1 receives the parameter from the personal computer and the like. The parameter input unit 1 sends the received parameter to the transmission error non-detection probability judging unit 2.

The header and data input unit 3 receives data to be transmitted to the receiving apparatus R4, for example, from an application running in the equipment A, after the parameter input unit 1 receives the parameter. The header and data input unit 3 then sends the data length of the data to the transmission error non-detection probability judging unit 2, and sends a header and data to the data dividing unit 5.

The transmission error non-detection probability judging unit 2 calculates the transmission interval so as to achieve the reference value of the transmission error non-detection probability, in other words, the reciprocal of the number of messages per time, based on the data length received from the header and data input unit 3, the parameter received from the parameter input unit 1, and predetermined division length and CRC code length (generator polynomial) stored in the transmission error non-detection probability judging unit 2 (Step S21).

The data dividing unit 5 sends the header received from the header and data input unit 3 to the header CRC generating unit 11 and the transmission data assembling unit 7. The header CRC generating unit 11 generates a header CRC based on the header received from the data dividing unit 5, by using a predetermined CRC generator polynomial stored therein (Step S7), and sends the header CRC to the transmission data assembling unit 7.

The data dividing unit 5, based on a predetermined division length stored therein, divides the data received from the header and data input unit 3 into segments, and extracts the divided data segments (Step S8). The data dividing unit 5 then sends the divided data to the data CRC generating unit 6 and the transmission data assembling unit 7. The data CRC generating unit 6 generates a data CRC from the divided data received from the data dividing unit 5, by calculating the data CRC using a predetermined CRC generator polynomial stored therein (Step S9), and sends the data CRC to the transmission data assembling unit 7.

The transmission data assembling unit 7 assembles transmission data (message) with the header and the divided data received from the data dividing unit 5, the header CRC received from the header CRC generating unit 11, and the data CRC received from the data CRC generating unit 6 (Step S10). The transmission data assembling unit 7 then determines whether the extraction (assembly) of the divided data received from the data dividing unit 5 is completed (Step S11).

If the transmission data assembling unit 7 determines that the extraction is not yet competed (NO at Step S11), the process returns to Step S8 and the process is repeated until the extraction is completed. If the transmission data assembling unit 7 determines that the extraction is completed (YES at Step S11), the transmission data assembling unit 7 sends the transmission data (message) to the transmitting unit 8. Upon receiving the transmission data (message) from the transmission data assembling unit 7, the transmitting unit 8 waits as much as the transmission interval received from the transmission error non-detection probability judging unit 2 from the previous transmission (Step S22), transmits the transmission data (message) to the communication line C, and finishes the series of processes (Step S12). The transmission data (message) transmitted from the transmitting apparatus T4 is sent to the receiving apparatus R4 through the communication line C. The transmitting unit 8 does not need to wait as much as the transmission interval in the first data transmission.

Every time the transmitting apparatus T4 receives data from the application running in the equipment A, the process is repeated from Step S1 to Step S22. However, when the same parameters are used, the process at Step S1 may be omitted in the second and subsequent processes.

FIG. 4-4 is a block diagram for explaining a configuration of the receiving apparatus R4 of the communication system S4 according to the fourth embodiment. The receiving apparatus R4 includes the receiving unit 21, a header judging unit 30, the data dividing unit 23, the data CRC judging unit 24, the data assembling unit 25, the data output unit 26, and the header CRC judging unit 29.

The receiving unit 21 receives reception data (message) as shown in FIG. 1-3 from the communication line, and sends the reception data (message) to the header judging unit 30. The header judging unit 30 obtains a header and a header CRC from the reception data received from the receiving unit 21, and sends the header and the header CRC to the header CRC judging unit 29. The header judging unit 30 receives the judgment result from the header CRC judging unit 29, and only if the judgment result is OK (the check result is correct), sends the reception data to the data dividing unit 23.

The header CRC judging unit 29 checks the header CRC based on the header and the header CRC received from the header judging unit 30, by using a predetermined generator polynomial stored therein, and notifies the header judging unit 30 of the judgment result. The judgment result is either NG (the check result is wrong) or OK (the check result is correct).

The data dividing unit 23 divides the reception data into segments whose length is obtained by adding a predetermined division length stored therein and a predetermined CRC code length stored therein, and sends the whole, in other words, the divided data and the data CRC to the data CRC judging unit 24. The data dividing unit 23 also sends the divided data formed of data portions, to the data assembling unit 25.

The data CRC judging unit 24 checks the data CRC based on the divided data and the data CRC received from the data dividing unit 23, by using a predetermined generator polynomial stored therein, and notifies the data assembling unit 25 of the judgment result. The judgment result is either NG (the check result is wrong) or OK (the check result is correct).

The data assembling unit 25 receives the judgment result sent from the data CRC judging unit 24, and only if all the judgment results of the divided data segments are OK (the check result is correct), assembles the divided data, and sends the data to the data output unit 26. The data output unit 26 receives the data sent from the data assembling unit 25, and outputs the data to the application and the like running in the equipment B.

A reception process performed by the receiving apparatus R4 will be described with reference to FIG. 4-5. FIG. 4-5 is a flowchart for explaining a process performed by the receiving apparatus R4 according to the fourth embodiment. The receiving unit 21 of the receiving apparatus R4 receives reception data (message) from the communication line (Step S31), and sends the reception data (message) to the header judging unit 30. The header judging unit 30 obtains a header and a header CRC from the reception data received from the receiving unit 21, and sends the header and the header CRC to the header CRC judging unit 29.

The header CRC judging unit 29 checks the header CRC based on the header, by using a predetermined generator polynomial stored therein (Step S32), and notifies the header judging unit 30 of the judgment result. The judgment result is either NG (the check result is wrong) or OK (the check result is correct).

Upon receiving the judgment result from the header CRC judging unit 29, and if the judgment result is NG (the check result is wrong) (NO at Step S32), the header judging unit 30 determines that an error is detected in the reception data (Step S33), and finishes the series of processes. Upon receiving the judgment result from the header CRC judging unit 29, and if the judgment result is OK (the check result is correct) (YES at Step S32), the header judging unit 30 sends the reception data to the data dividing unit 23.

The data dividing unit 23 divides the reception data into segments whose length is obtained by adding a predetermined division length stored therein and a predetermined CRC code length stored therein, and reads the divided data (Step S35). The data dividing unit 23 then sends the divided data and the data CRC to the data CRC judging unit 24. The data dividing unit 23 also sends the divided data formed of data portions, to the data assembling unit 25.

The data CRC judging unit 24 checks the data CRC by using a predetermined generator polynomial (Step S36), and notifies the data assembling unit 25 of the judgment result. The judgment result is either NG (the check result is wrong) or OK (the check result is correct).

Upon receiving the judgment result from the data CRC judging unit 24, and if the judgment result is NG (the check result is wrong) (NO at Step S36), the data assembling unit 25 determines that an error is detected in the reception data (Step S33), and finishes the series of processes. Upon receiving the judgment result from the data CRC judging unit 24, and if the judgment result is OK (the check result is correct) (YES at Step S36), the data assembling unit 25 determines whether the data CRC of all the divided data segments has been checked (Step S37).

If the data assembling unit 25 determines that the data CRC of all the divided data segments has not been checked (NO at Step S37), the data assembling unit 25 sends information with which the check result is correct to the data CRC judging unit 24, and the process returns to Step S35. The data CRC judging unit 24 receives the information, and checks the CRC of the next divided data segment (Step S35). The processes from Step S35 to Step S37 are repeated until the data CRC of all the divided data segments has been checked.

If the data assembling unit 25 determines that the CRC calculations performed on all the divided data segments are correct, and that the data CRC of all the divided data segments has been checked (YES at Step S37), the data assembling unit 25 determines that the data is received properly (Step S38), assembles the divided data, and sends the data to the data output unit 26. The data output unit 26 receives the data sent from the data assembling unit 25, outputs the data to the application and the like running in the equipment B, and finishes the series of processes.

As described above, the transmitting apparatus T4 (communication system S4) according to the fourth embodiment can transmit messages, by controlling the transmission interval so as to ensure the upper limit of the non-detection probability of message transmission errors per time. Accordingly, it is possible to perform communication while ensuring the desired reliability of correct communication, by restraining the transmission error non-detection probability of the message to equal to or less than a desired target value.

Fifth Embodiment

In a fifth embodiment, a modification of the first embodiment will be described. A communication system S5 according to the fifth embodiment includes a transmitting apparatus T5 and the receiving apparatus R1 connected with the communication line C (see FIG. 1-1). FIG. 5-1 is a block diagram for explaining a configuration of the transmitting apparatus T5 of the communication system S5 according to the fifth embodiment. The transmitting apparatus T5 includes the parameter input unit 1, the transmission error non-detection probability judging unit 2, the header and data input unit 3, the division length determining unit 4, the data dividing unit 5, the data CRC generating unit 6, the header CRC generating unit 11, the transmission data assembling unit 7, and the transmitting unit 8.

Because the basic configuration of the transmitting apparatus T5 is the same as that of the transmitting apparatus T1 according to the first embodiment, the different points from the transmitting apparatus T1 will be described below. In the communication system S5 according to the fifth embodiment, the parameter input unit 1 in the transmitting apparatus T1 of the first embodiment receives a parameter from which the number of messages per time is removed. In other words, the transmitting apparatus T5 of the communication system S5 receives a parameter including a reference value of the transmission error non-detection probability of the message per time, a probability of generating bit errors in a communication channel, a transmission rate of the communication channel, and the number of pieces of communication equipment being connected.

The division length determining unit 4 initializes the division length with the data length, and sends the data length and the division length to the transmission error non-detection probability judging unit 2. At this time, the transmission error non-detection probability judging unit 2 calculates a transmission interval that can achieve a desired transmission error non-detection probability (reference value), by using an evaluation function obtained by modifying the above-described evaluation function (1), using the delivered division length, the received parameter, and a predetermined code length, and notifies the division length determining unit 4 of the transmission interval as a judgment result.

If the transmission interval is feasible, the division length determining unit 4 adopts the division length and the transmission interval at this time, and sends the transmission interval to the transmitting unit 8. If the transmission interval is not feasible, the division length determining unit 4 reduces the division length, and delivers the increased division length to the transmission error non-detection probability judging unit 2 again. The process is repeated until the feasible transmission interval is obtained. Upon receiving the transmission data (message) from the transmission data assembling unit 7, the transmitting unit 8 waits as much as the transmission interval received from the division length determining unit 4 from the previous transmission, and transmits the transmission data (message) to the communication line C.

A transmission process performed by the transmitting apparatus T5 will be described with reference to FIG. 5-2. FIG. 5-2 is a flowchart for explaining a process performed by the transmitting apparatus T5 according to the fifth embodiment. The parameter input unit 1 receives a parameter (Step S1). As described above, the parameter does not include the number of messages per time. The parameter input unit 1 sends the received parameter to the transmission error non-detection probability judging unit 2.

The header and data input unit 3 receives data to be transmitted to the receiving apparatus R1, for example, from an application running in the equipment A, after the parameter input unit 1 receives the parameter. The header and data input unit 3 then sends the data length of the data to the division length determining unit 4, and sends a header and data to the data dividing unit 5.

Upon receiving the data length from the header and data input unit 3, the division length determining unit 4 sets (initializes) the received data length as an initial value of the division length (Step S2). The division length determining unit 4 then sends the division length and the data length to the transmission error non-detection probability judging unit 2. The transmission error non-detection probability judging unit 2 calculates a transmission interval that can achieve a desired transmission error non-detection probability (reference value), based on the division length received from the division length determining unit 4, the parameter received from the parameter input unit 1, and a predetermined CRC code length (generator polynomial) stored therein (Step S23), and notifies the division length determining unit 4 of the transmission interval as a judgment result.

The division length determining unit 4 determines whether the transmission interval received from the transmission error non-detection probability judging unit 2 is feasible (Step S24). If the transmission interval is not feasible (NO at Step S24), the division length determining unit 4 reduces the division length, and notifies the transmission error non-detection probability judging unit 2 of the data length and the reduced division length again (Step S5). The process is repeated until the feasible transmission interval is obtained. If the transmission interval is feasible (YES at Step S24), the division length determining unit 4 adopts the division length and the transmission interval at this time, and sends the transmission interval to the transmitting unit 8.

Because the subsequent Steps S6 to S11 are the same as those in the first embodiment, the description thereof is omitted. After Step S11 is performed, upon receiving the transmission data (message) from the transmission data assembling unit 7, the transmitting unit 8 waits as much as the transmission interval received from the transmission error non-detection probability judging unit 2 from the previous transmission (Step S22), transmits the transmission data (message) to the communication line C, and finishes the series of processes (Step S12). The transmission data (message) transmitted from the transmitting apparatus T5 is sent to the receiving apparatus R1 through the communication line C. The transmitting unit 8 does not need to wait as much as the transmission interval in the first data transmission.

As described above, the transmitting apparatus T5 (communication system S5) according to the fifth embodiment can transmit messages, by dividing the data and by controlling the transmission interval at the same time, so as to ensure the upper limit of the non-detection probability of message transmission errors per time. Accordingly, it is possible to perform communication while ensuring the desired reliability of correct communication, by restraining the transmission error non-detection probability of the message to equal to or less than a desired target value. Because unnecessary data division and coding are not performed, it is possible to perform efficient communication.

Sixth Embodiment

Figures 1, 2, 3, 4, 5, 6:
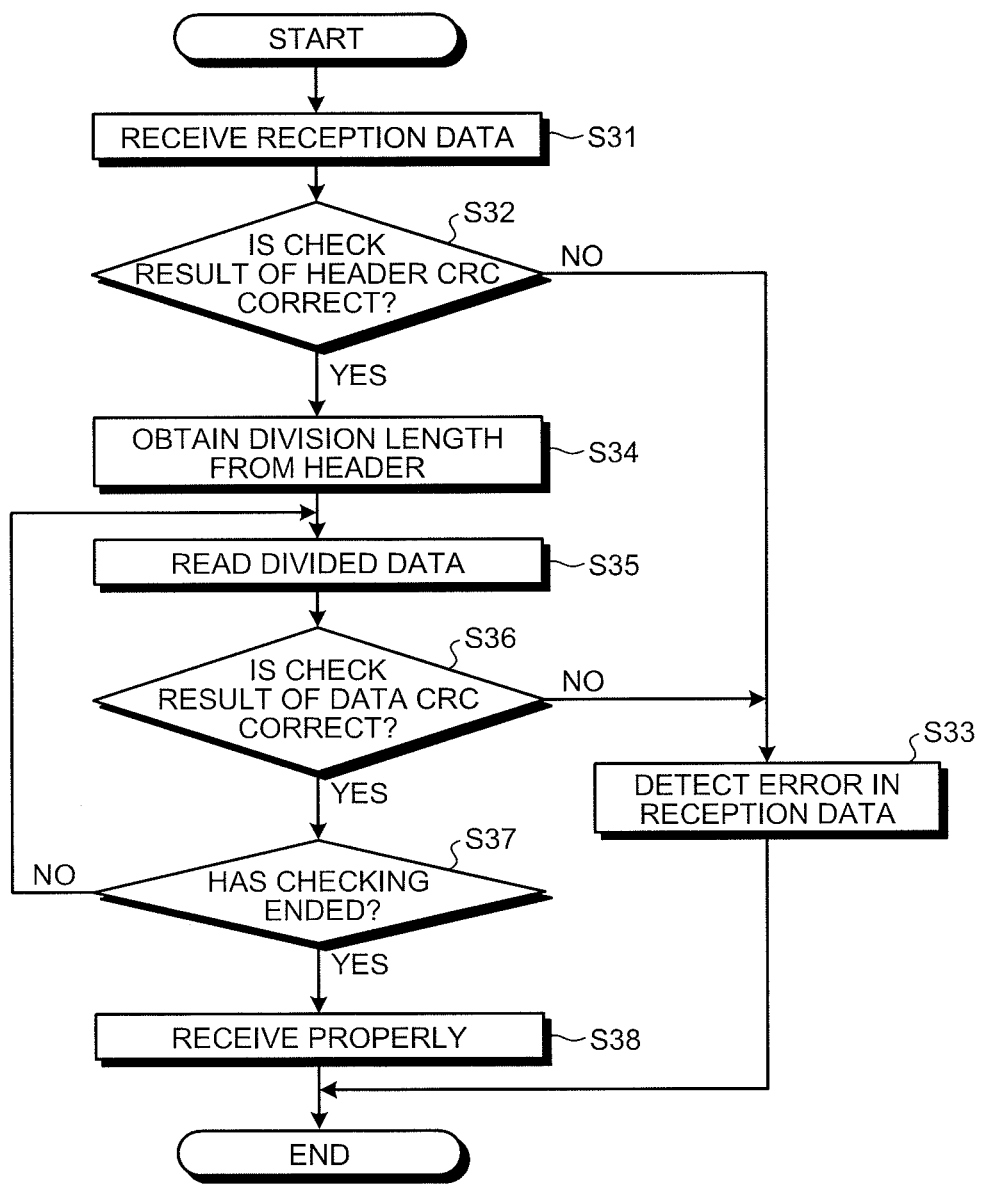
Figure 2:
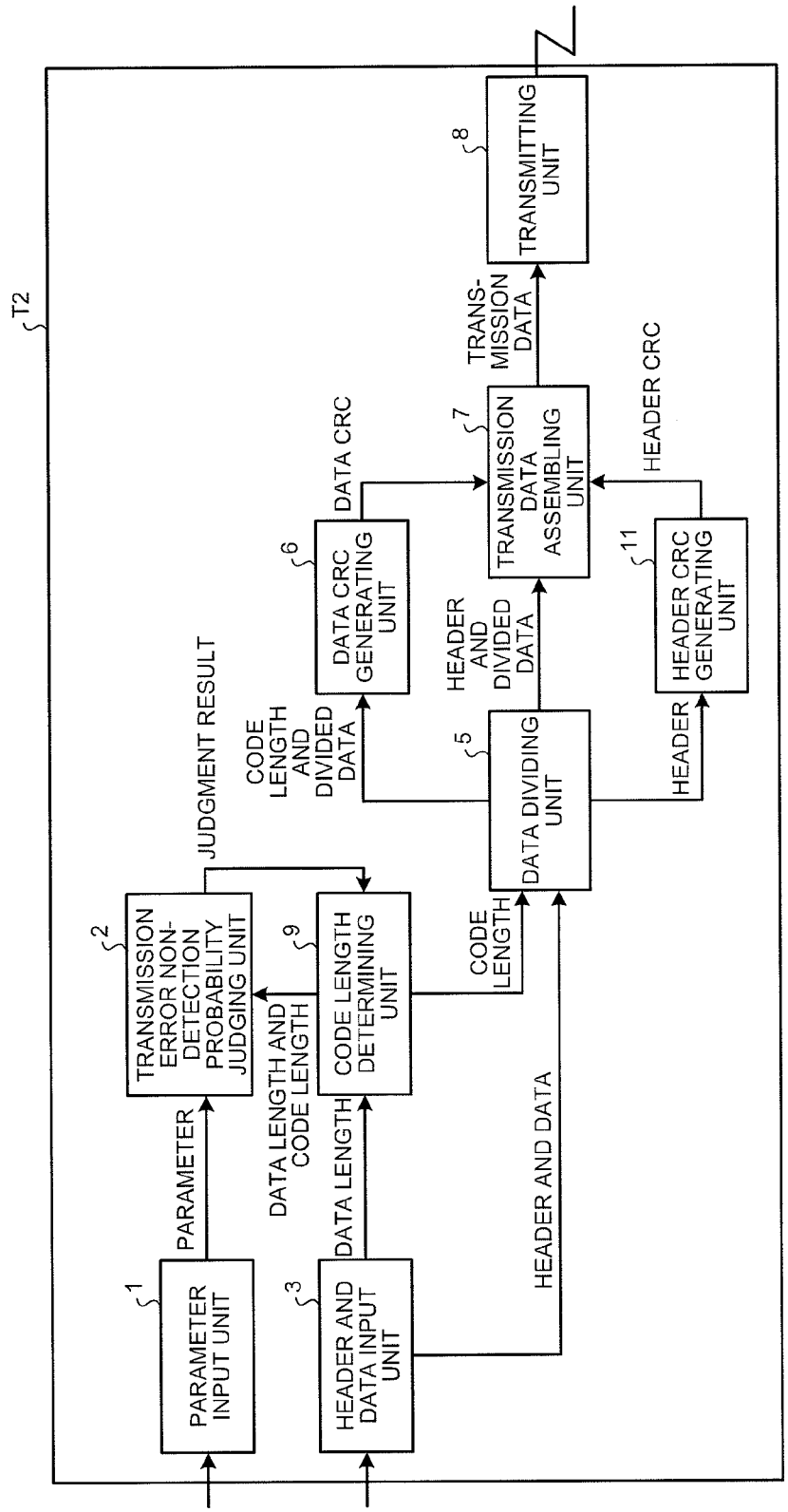
Figures 2, 3, 4:
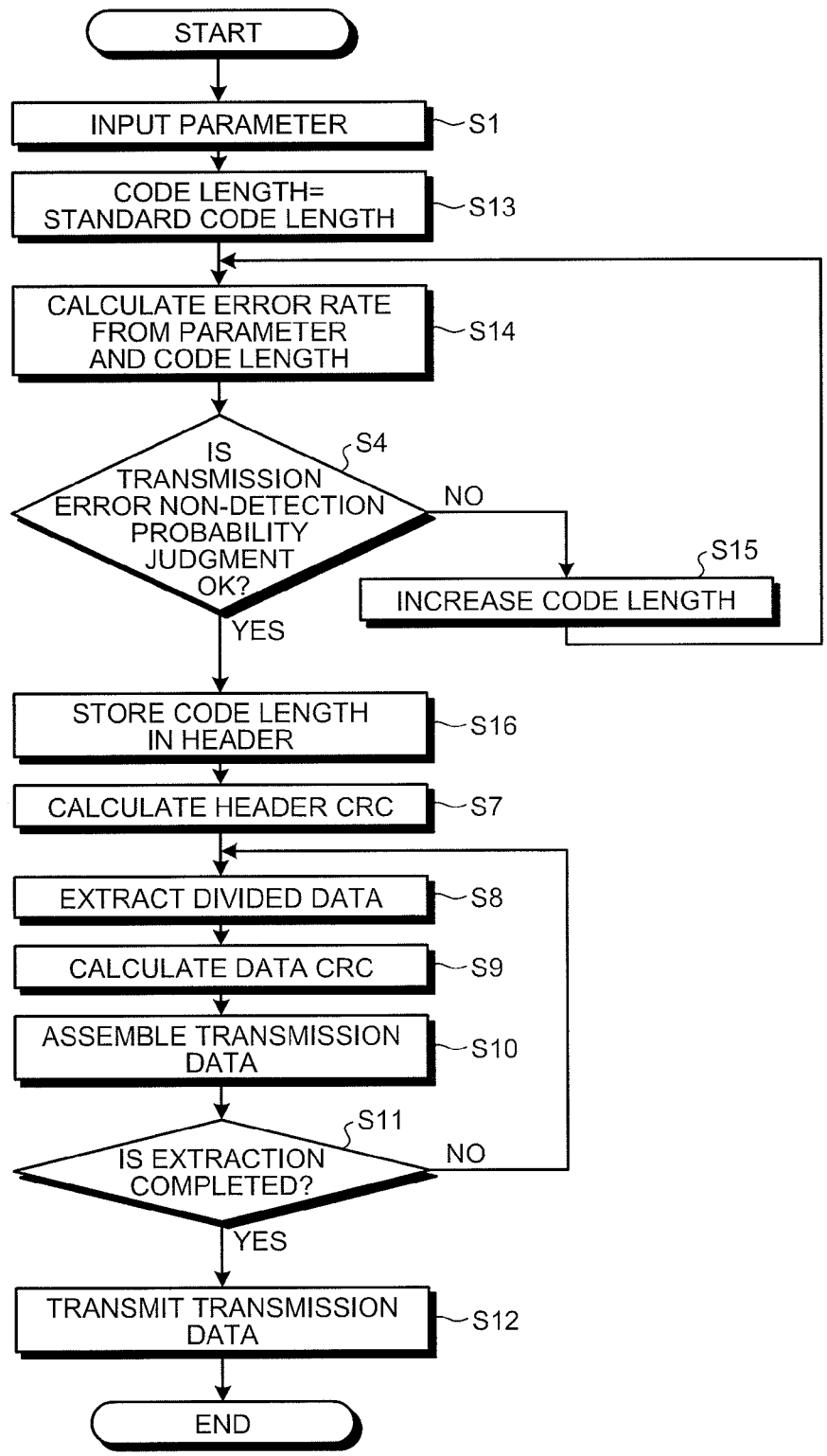
Figures 2, 3, 4, 5:
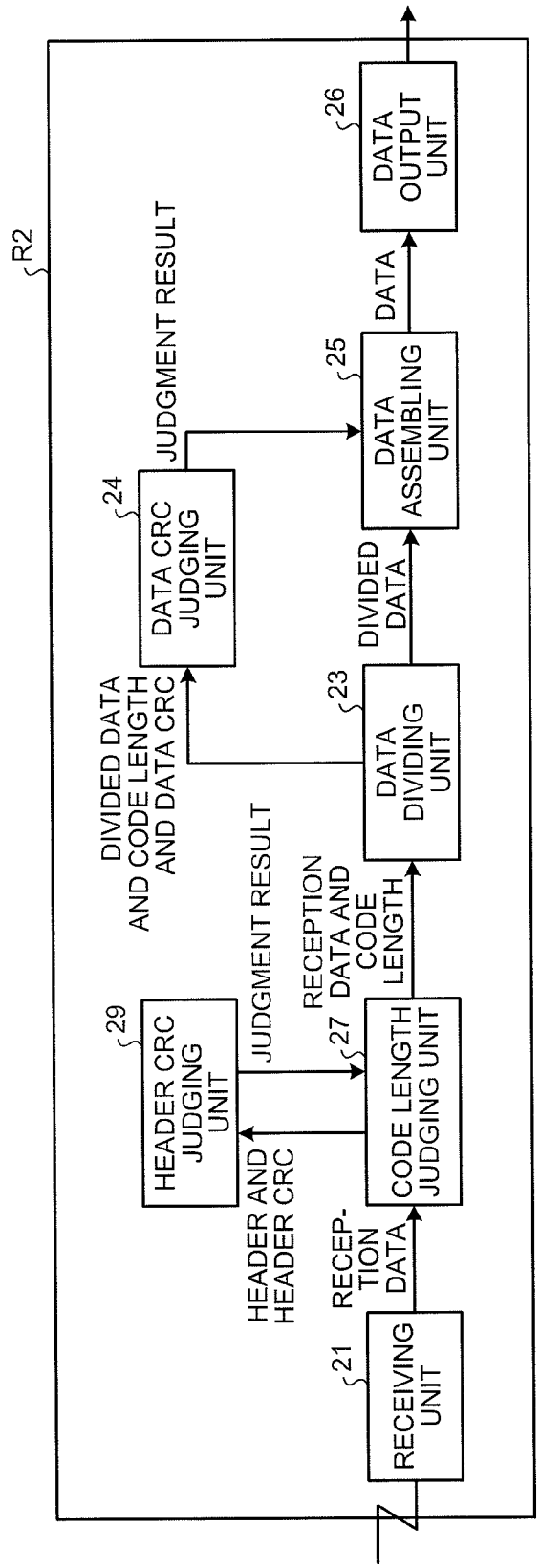
Figures 2, 3, 4, 5, 6:
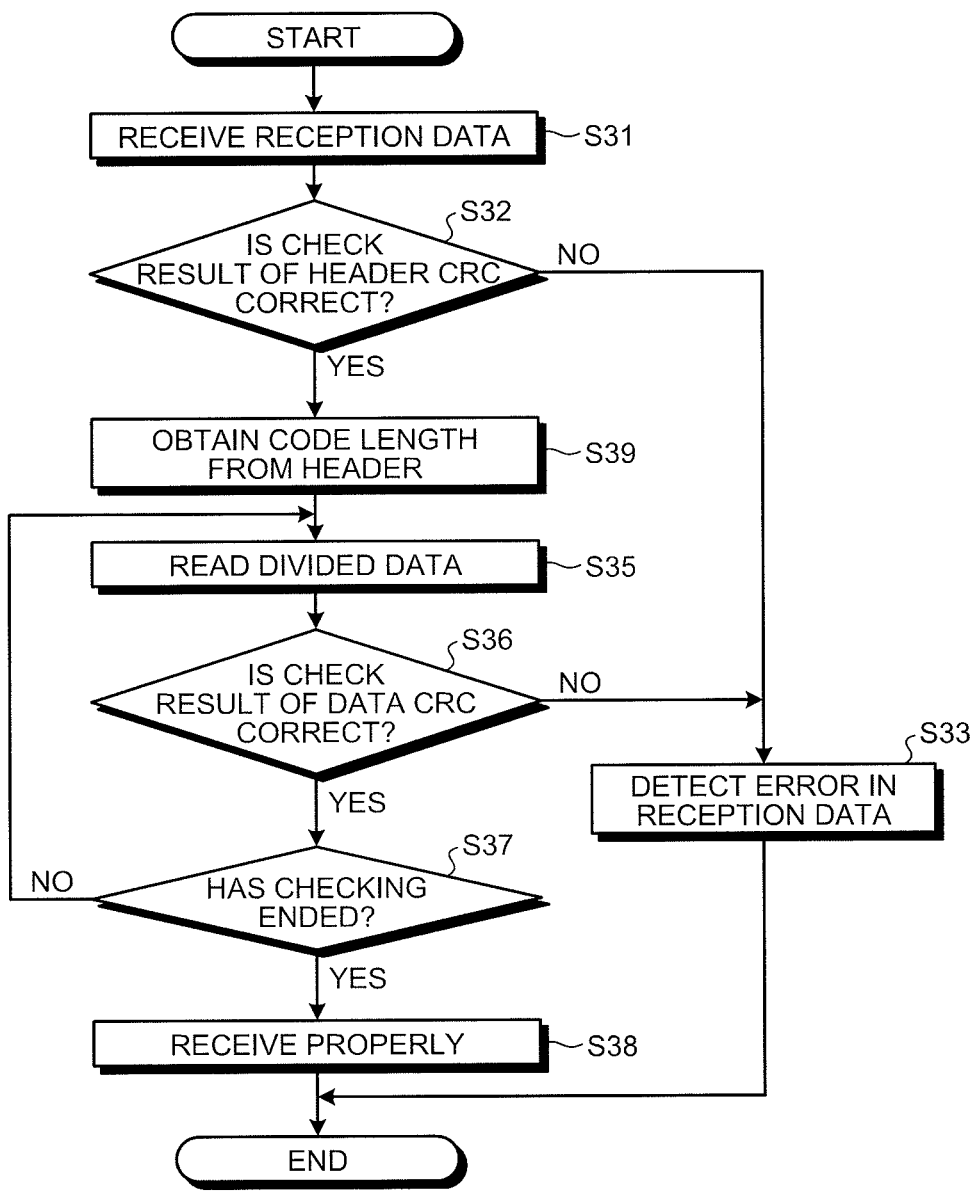
Figures 1, 3:
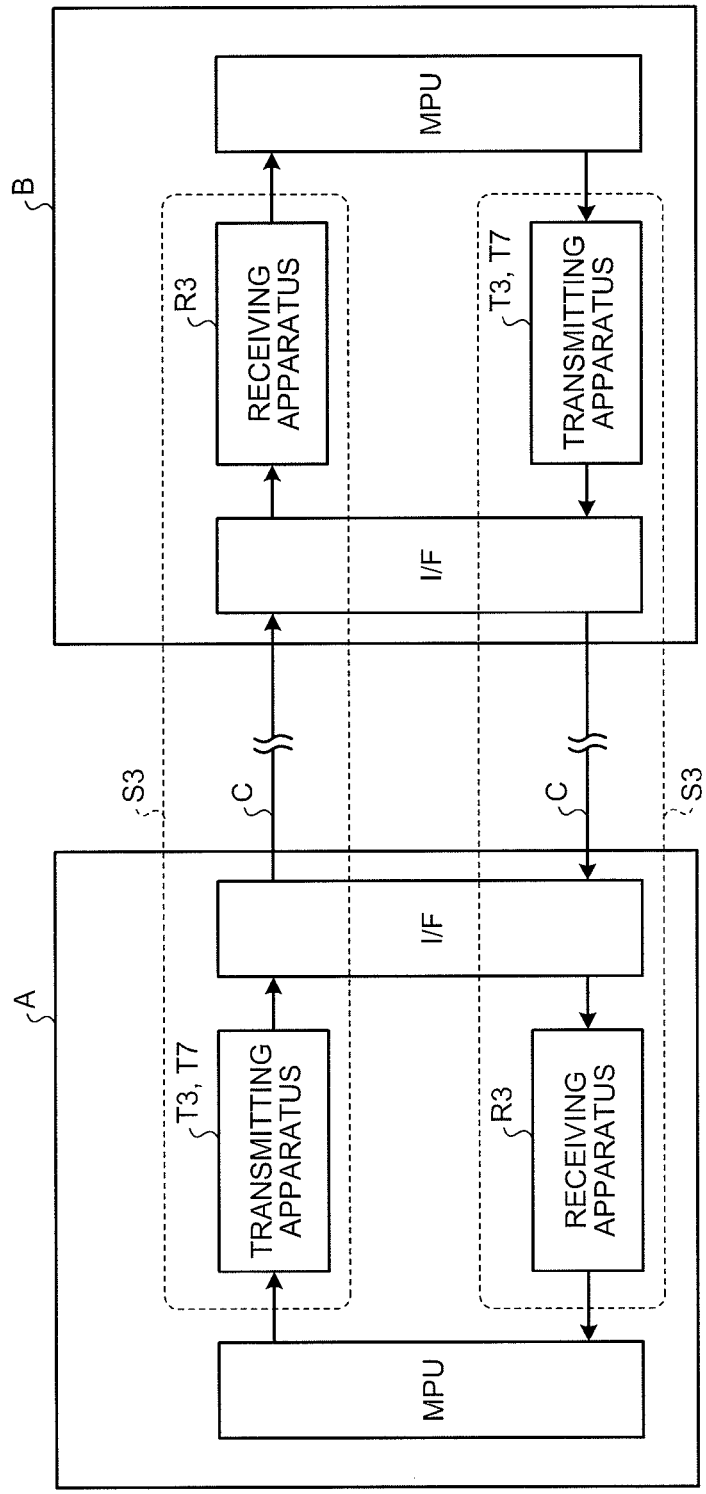
Figures 2, 3:
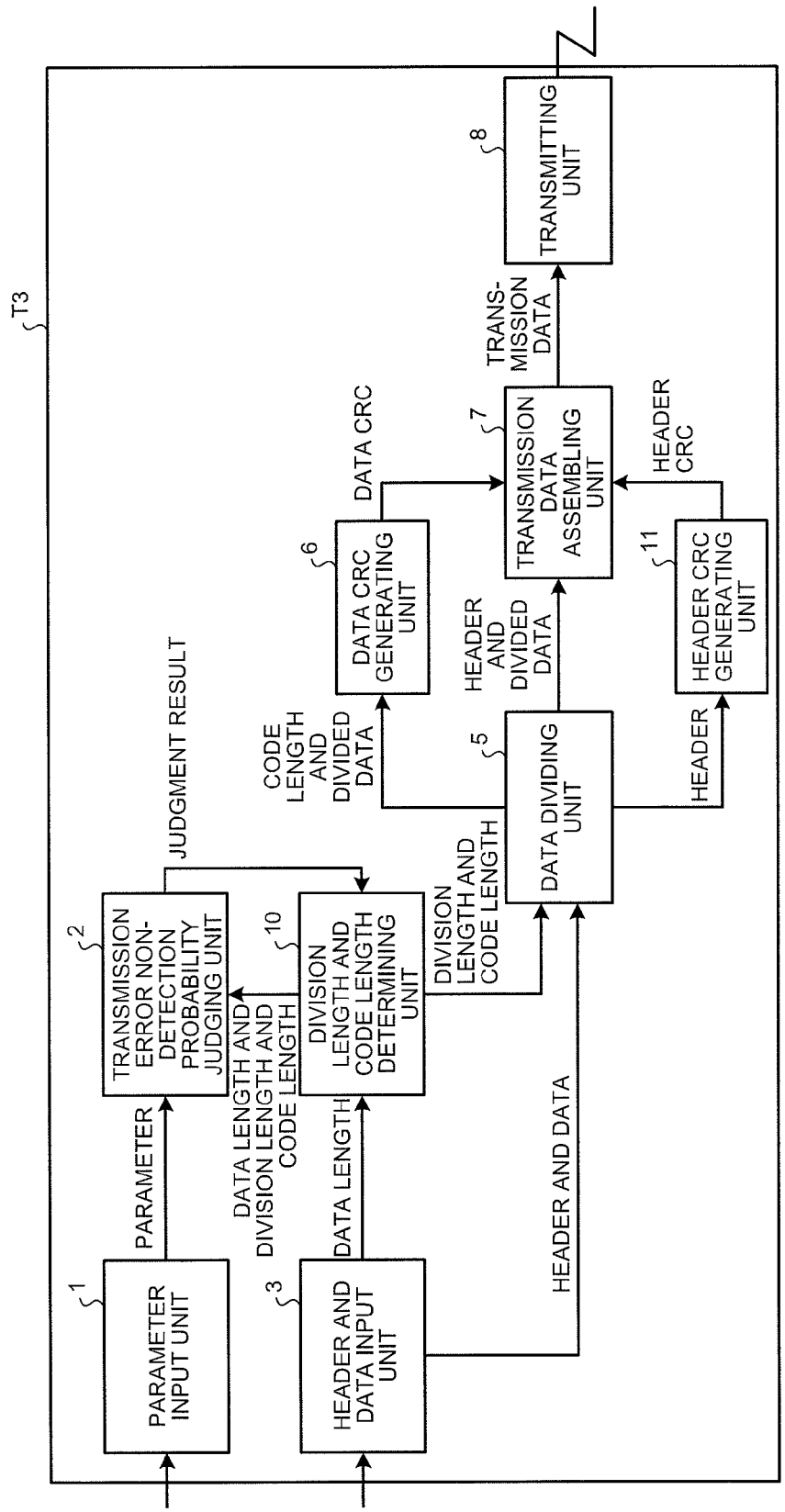
Figure 3:
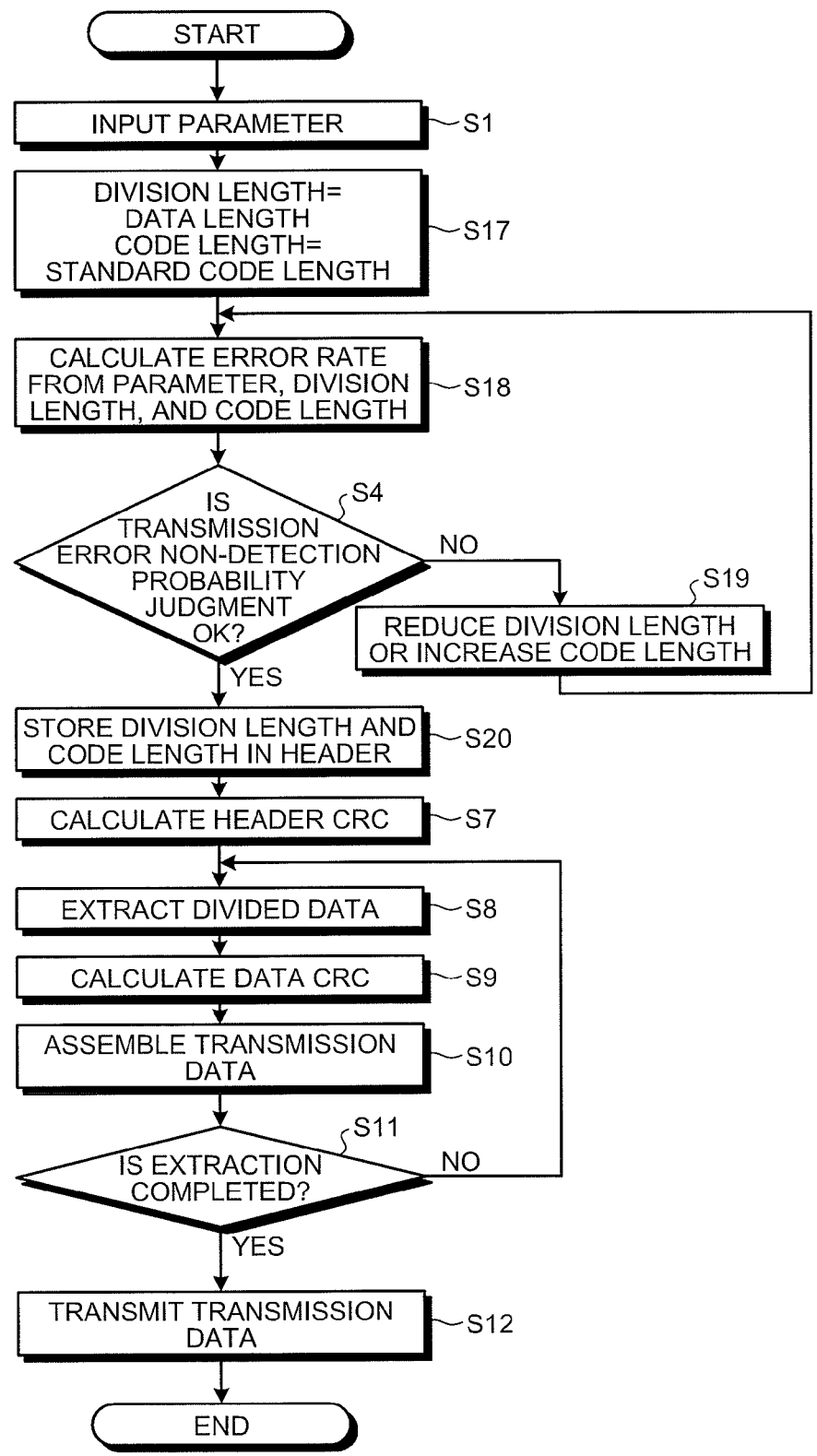
Figures 3, 4:
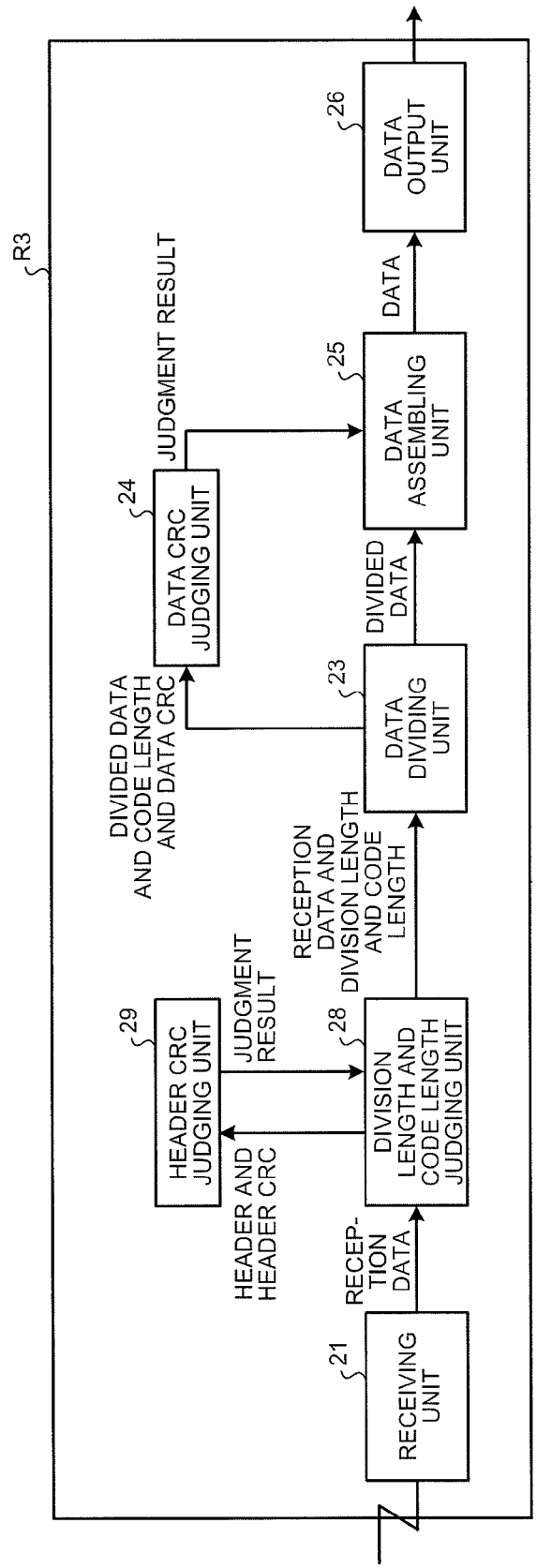
Figures 3, 4, 5:
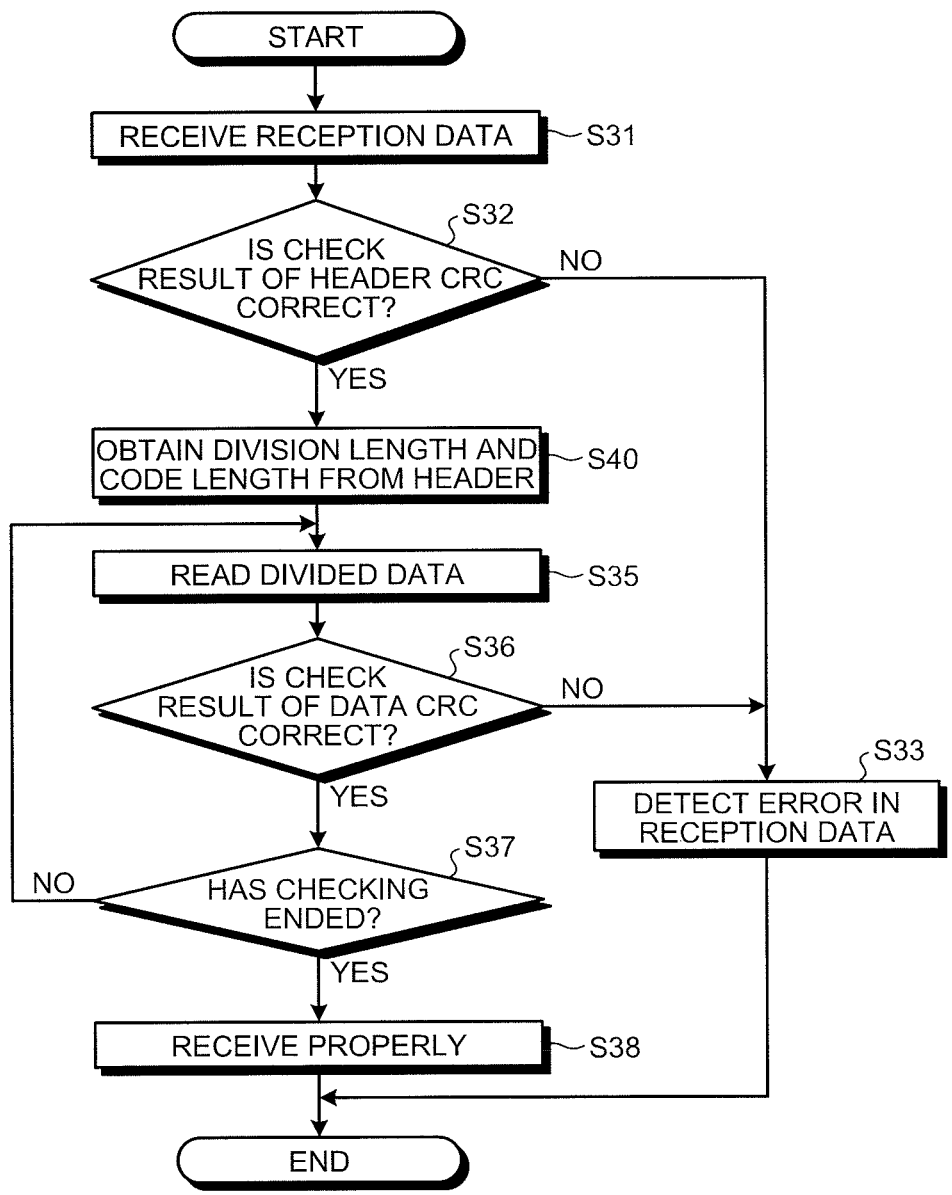
Figures 2, 4:
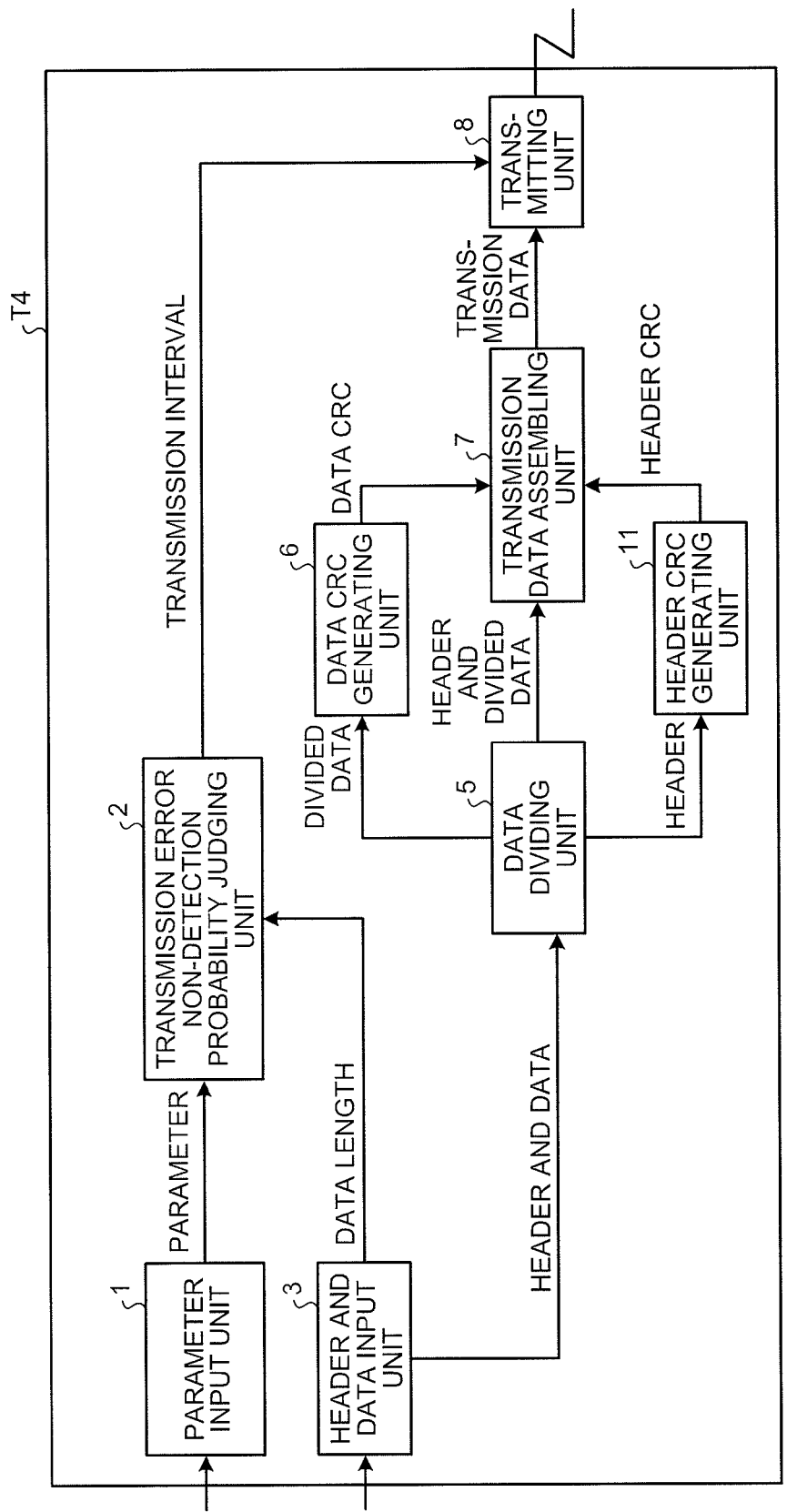
Figures 3, 4:
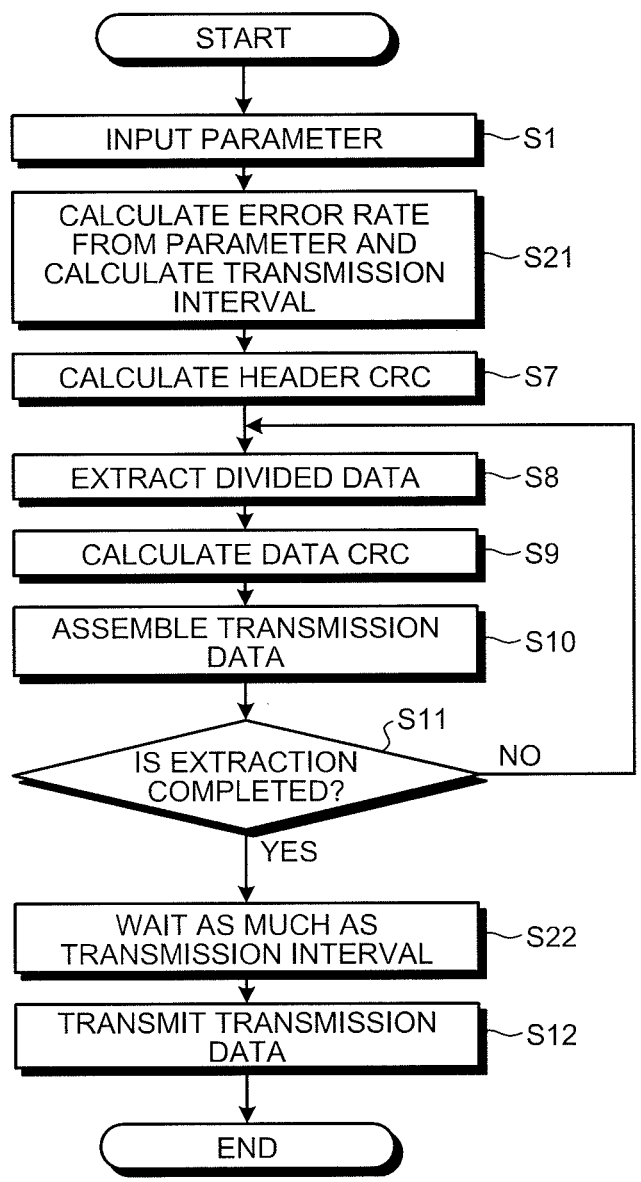
Figure 4:
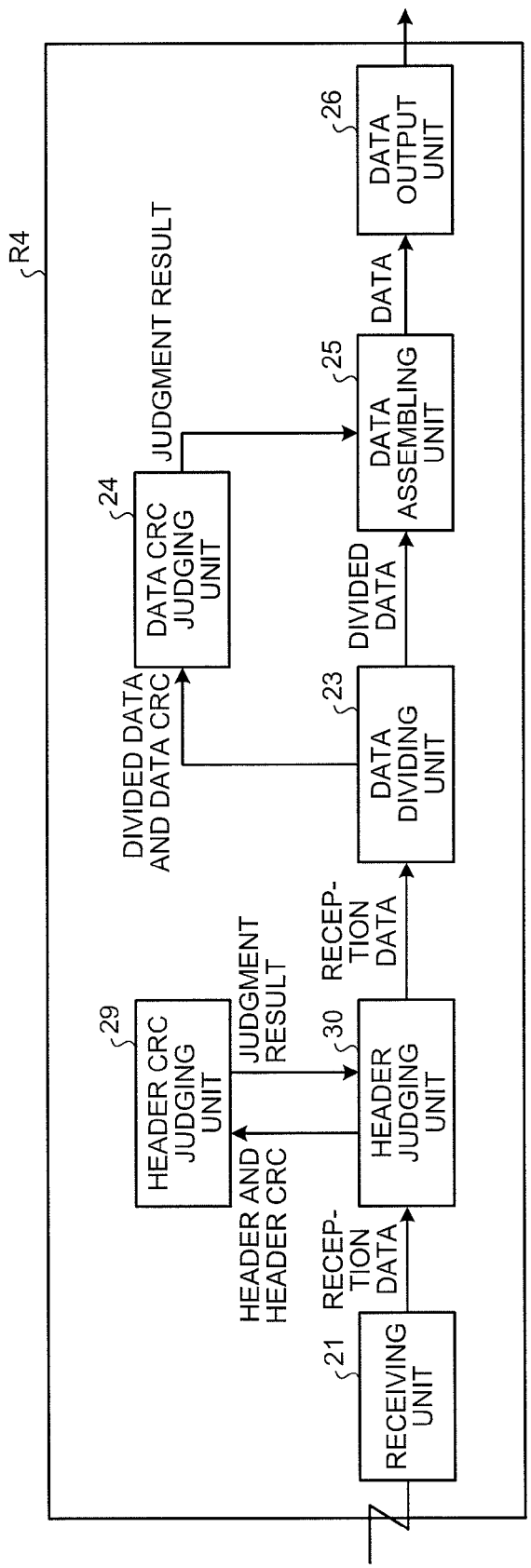
Figures 4, 5:
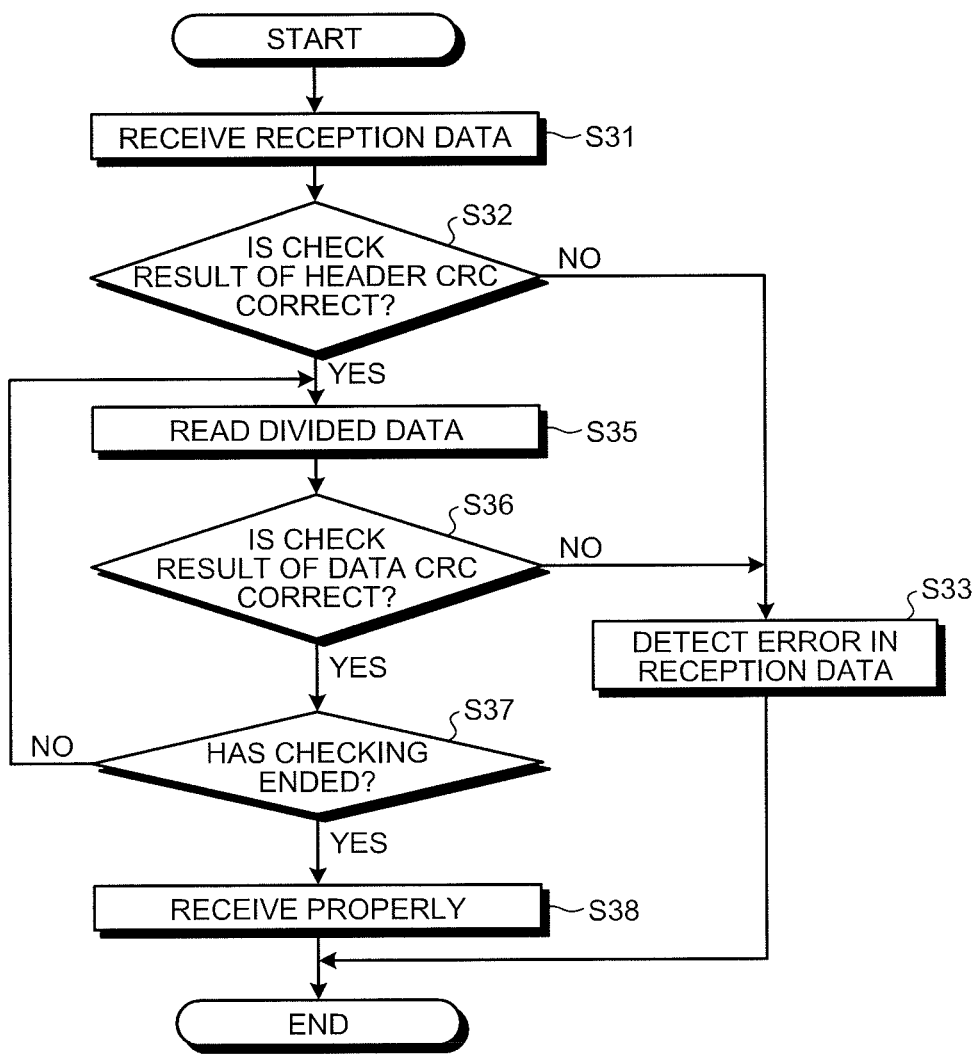
Figures 1, 5:
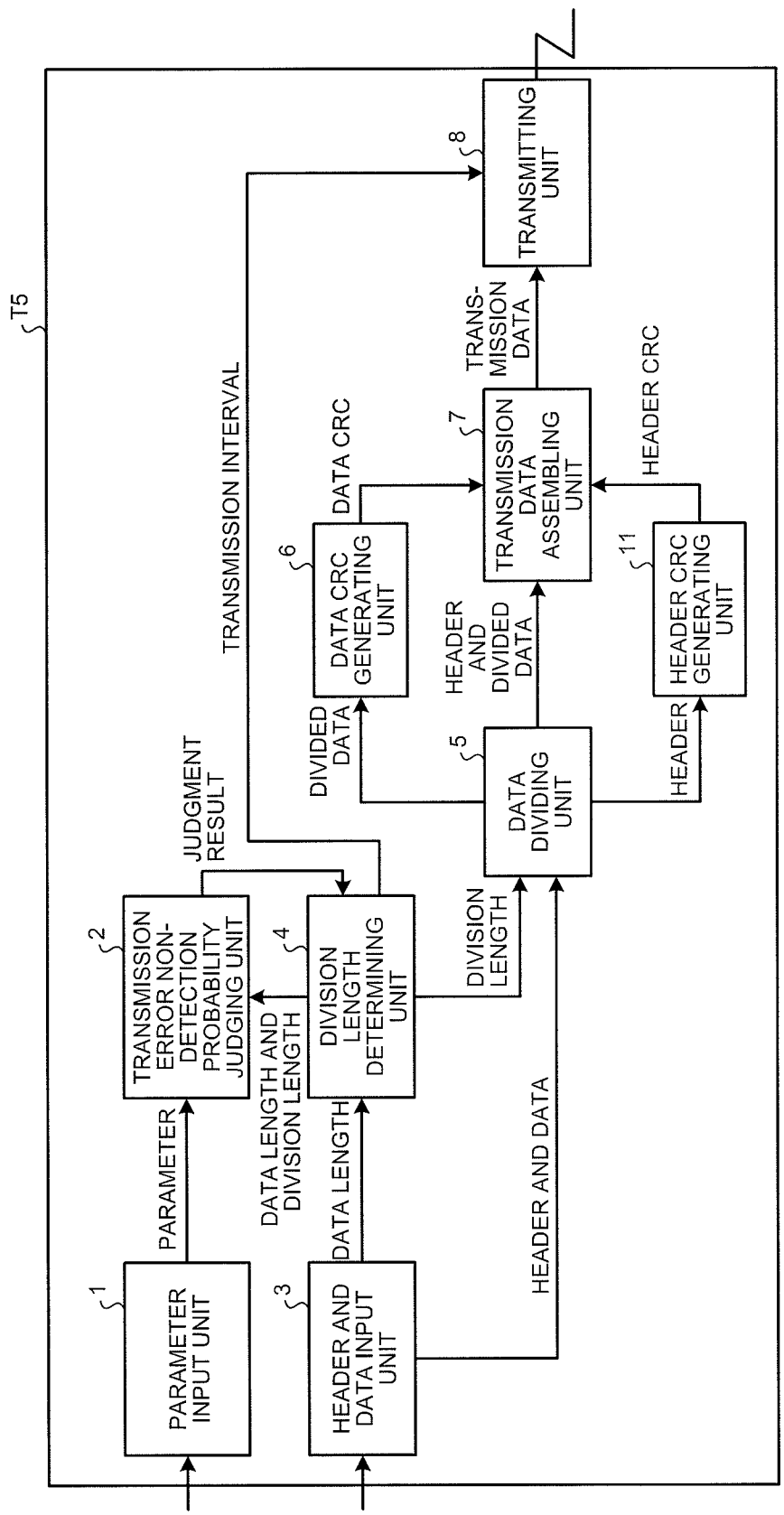
Figures 2, 5:
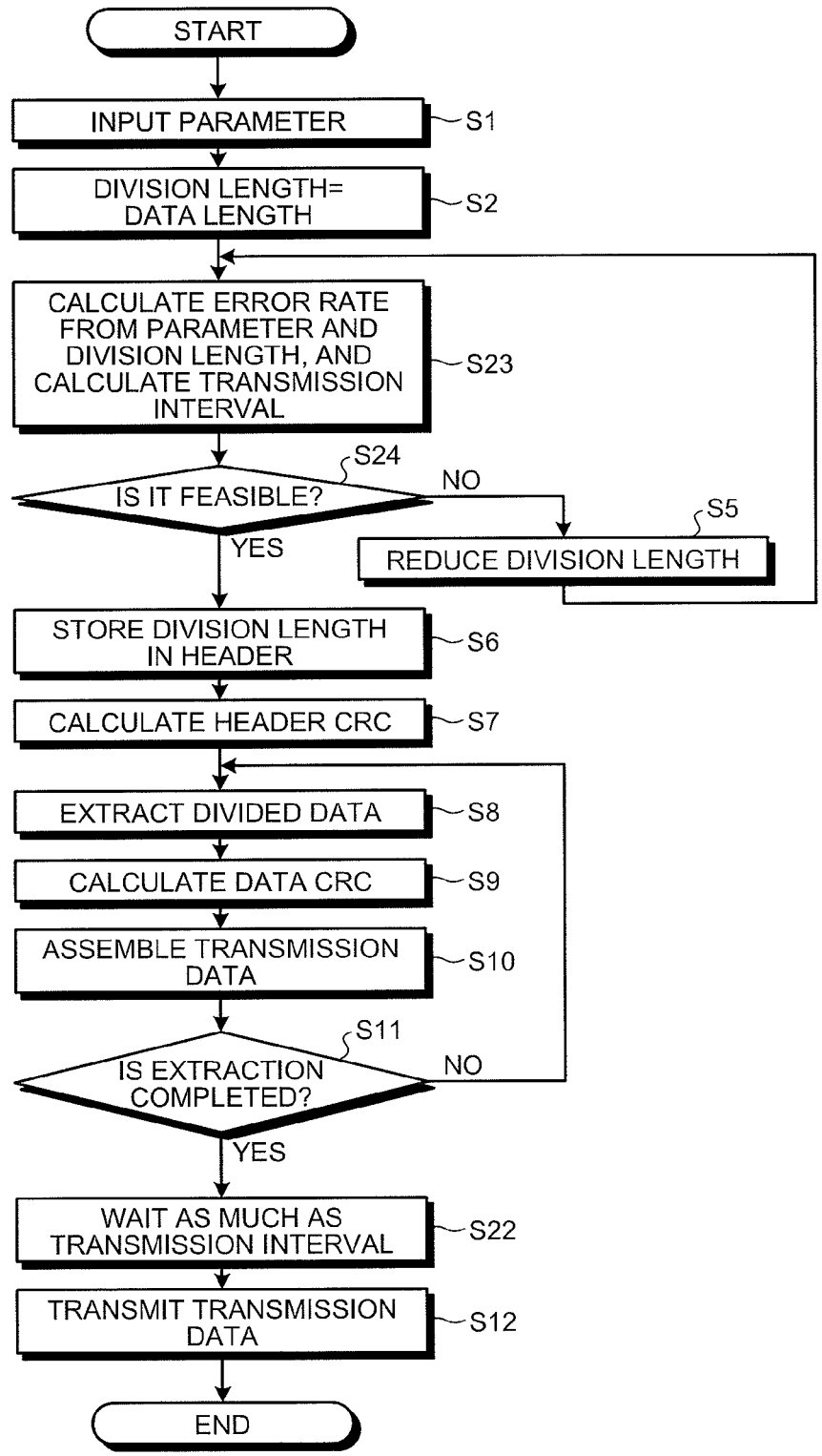
Figures 1, 6:
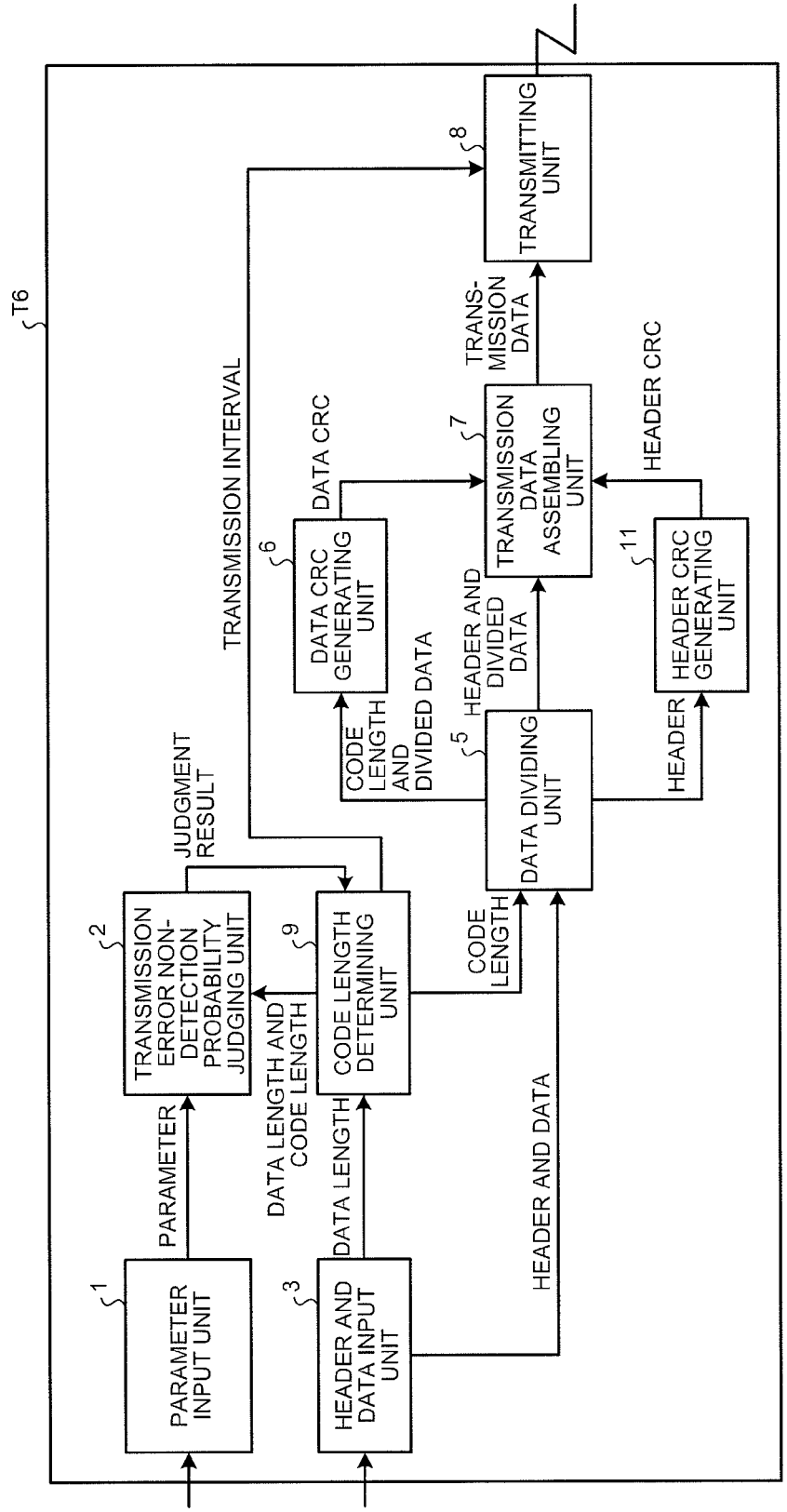
Figures 2, 6:
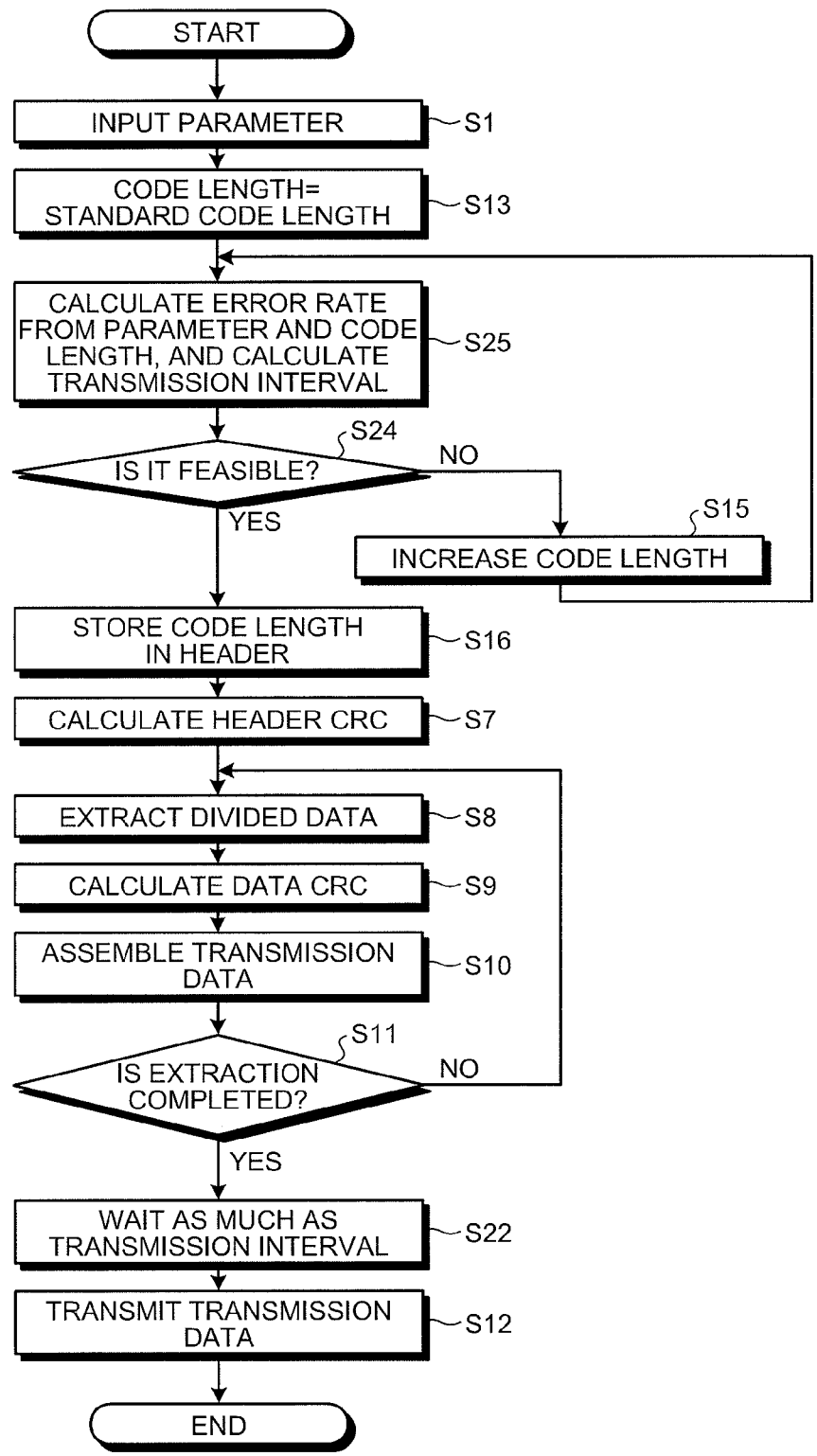

In a sixth embodiment, a modification of the second embodiment will be described. A communication system S6 according to the sixth embodiment includes a transmitting apparatus T6 and the receiving apparatus R2 connected with the communication line C (see FIG. 2-1). FIG. 6-1 is a block diagram for explaining a configuration of the transmitting apparatus T6 of the communication system S6 according to the sixth embodiment. The transmitting apparatus T6 includes the parameter input unit 1, the transmission error non-detection probability judging unit 2, the header and data input unit 3, the code length determining unit 9, the data dividing unit 5, the data CRC generating unit 6, the header CRC generating unit 11, the transmission data assembling unit 7, and the transmitting unit 8.

Because the basic configuration of the transmitting apparatus T6 is the same as that of the transmitting apparatus T2 according to the second embodiment, the different points from the transmitting apparatus T2 will be described below. In the communication system S6 according to the sixth embodiment, the parameter input unit 1 in the transmitting apparatus T2 of the second embodiment receives a parameter from which the number of messages per time is removed. In other words, the transmitting apparatus T6 of the communication system S6 receives a parameter including a reference value of the transmission error non-detection probability of the message per time, a probability of generating bit errors in a communication channel, a transmission rate of the communication channel, and the number of pieces of communication equipment being connected.

The code length determining unit 9 initializes the code length with the length of a standard generator polynomial, and sends the data length and the code length to the transmission error non-detection probability judging unit 2. At this time, the transmission error non-detection probability judging unit 2 calculates a transmission interval that can achieve a desired transmission error non-detection probability (reference value), by using an evaluation function obtained by modifying the above-described evaluation function (1), using the delivered code length, the received parameter, and a predetermined division length, and notifies the code length determining unit 9 of the transmission interval as a judgment result.

The code length determining unit 9 adopts the code length and the transmission interval at this time, and sends the transmission interval to the transmitting unit 8 if the transmission interval is feasible. If the transmission interval is not feasible, the code length determining unit 9 increases the code length, and delivers the increased code length to the transmission error non-detection probability judging unit 2 again. The process is repeated until the feasible transmission interval is obtained. Upon receiving the transmission data (message) from the transmission data assembling unit 7, the transmitting unit 8 waits as much as the transmission interval received from the code length determining unit 9, and transmits the transmission data (message) to the communication line C.

A transmission process performed by the transmitting apparatus T6 will be described with reference to FIG. 6-2. FIG. 6-2 is a flowchart for explaining a process performed by the transmitting apparatus T6 according to the sixth embodiment. The parameter input unit 1 receives a parameter (Step S1). As described above, the parameter does not include the number of messages per time. The parameter input unit 1 sends the received parameter to the transmission error non-detection probability judging unit 2.

The header and data input unit 3 receives data to be transmitted to the receiving apparatus R2, for example, from an application running in the equipment A, after the parameter input unit 1 receives the parameter. The header and data input unit 3 then sends the data length of the data to the code length determining unit 9, and sends a header and data to the data dividing unit 5.

The code length determining unit 9 sets the code length of a standard generator polynomial (such as 16 bits) in the code correspondence table 31 (see FIG. 2-3) as an initial value of the code length (initialization of code length), and sends the code length and the data length to the transmission error non-detection probability judging unit 2 (Step S13).

The transmission error non-detection probability judging unit 2 calculates a transmission interval that can achieve a desired transmission error non-detection probability (reference value) (Step S25), based on the data length and the code length received from the code length determining unit 9, the parameter received from the parameter input unit 1, and a predetermined division length stored in the transmission error non-detection probability judging unit 2, and notifies the code length determining unit 9 of the transmission interval as a judgment result.

The code length determining unit 9 determines whether the transmission interval received from the transmission error non-detection probability judging unit 2 is feasible (Step S24). If the transmission interval is not feasible (NO at Step S24), the code length determining unit 9 increases the code length, and notifies the transmission error non-detection probability judging unit 2 of the data length and the increased code length again (Step S15). The process is repeated until the feasible transmission interval is obtained. If the transmission interval is feasible (YES at Step S24), the code length determining unit 9 adopts the code length and the transmission interval at this time, and sends the transmission interval to the transmitting unit 8.

Because the subsequent Steps S16 to S11 are the same as those in the second embodiment, the description thereof is omitted. After Step S11 is performed, upon receiving the transmission data (message) from the transmission data assembling unit 7, the transmitting unit 8 waits as much as the transmission interval received from the code length determining unit 9 from the previous transmission (Step S22), transmits the transmission data (message) to the communication line C, and finishes the series of processes (Step S12). The transmission data (message) transmitted from the transmitting apparatus T6 is sent to the receiving apparatus R2 through the communication line C. The transmitting unit 8 does not need to wait as much as the transmission interval in the first data transmission.

As described above, the transmitting apparatus T6 (communication system S6) according to the sixth embodiment can transmit messages, by adding the CRC and by controlling the transmission interval at the same time, so as to ensure the upper limit of the non-detection probability of message transmission errors per time. Accordingly, it is possible to perform communication while ensuring the desired reliability of correct communication, by restraining the transmission error non-detection probability of the message to equal to or less than a desired target value. Because unnecessary data division and coding are not performed, it is possible to perform efficient communication.

Seventh Embodiment

Figures 1, 7:
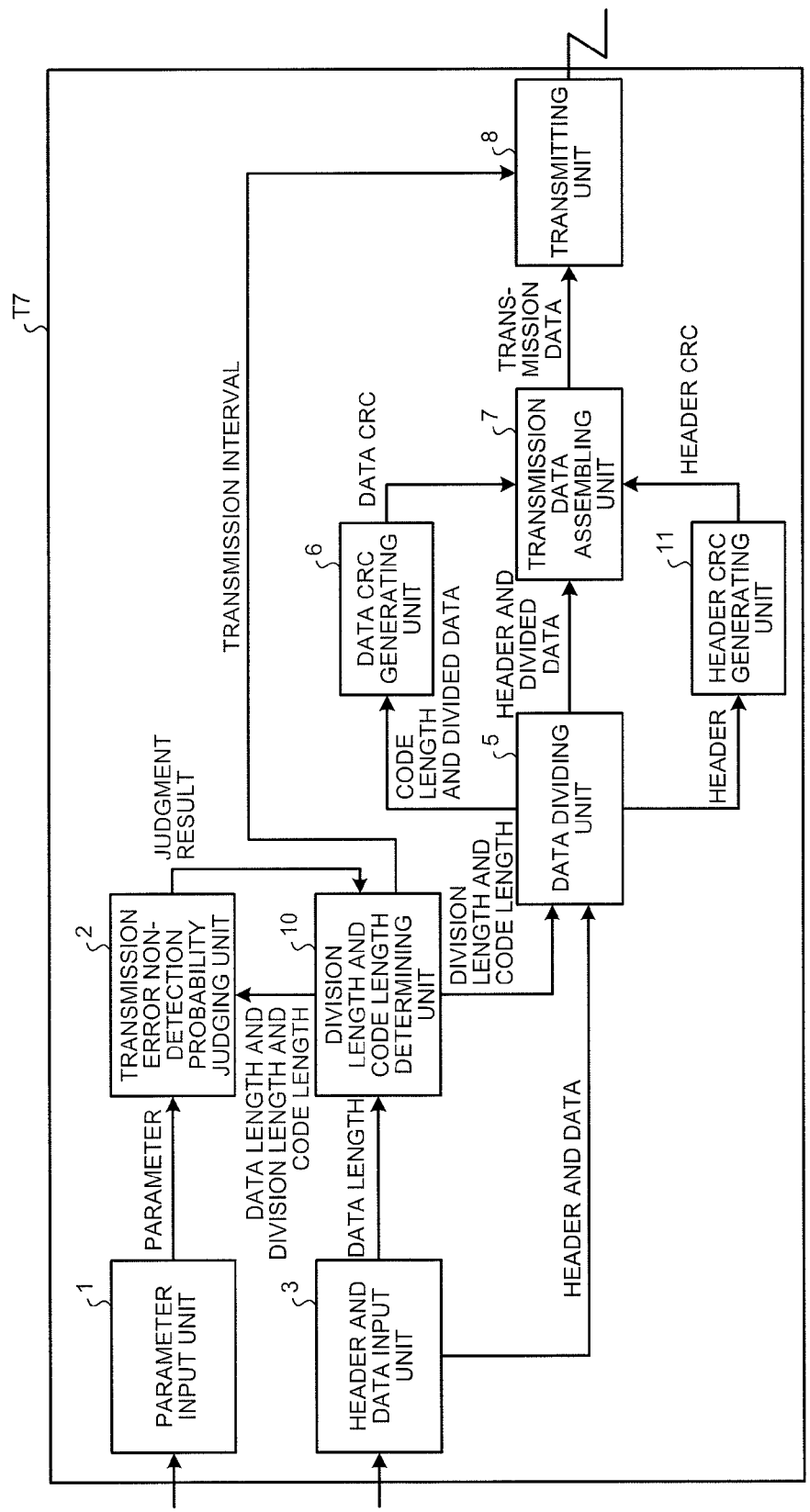
Figures 2, 7:
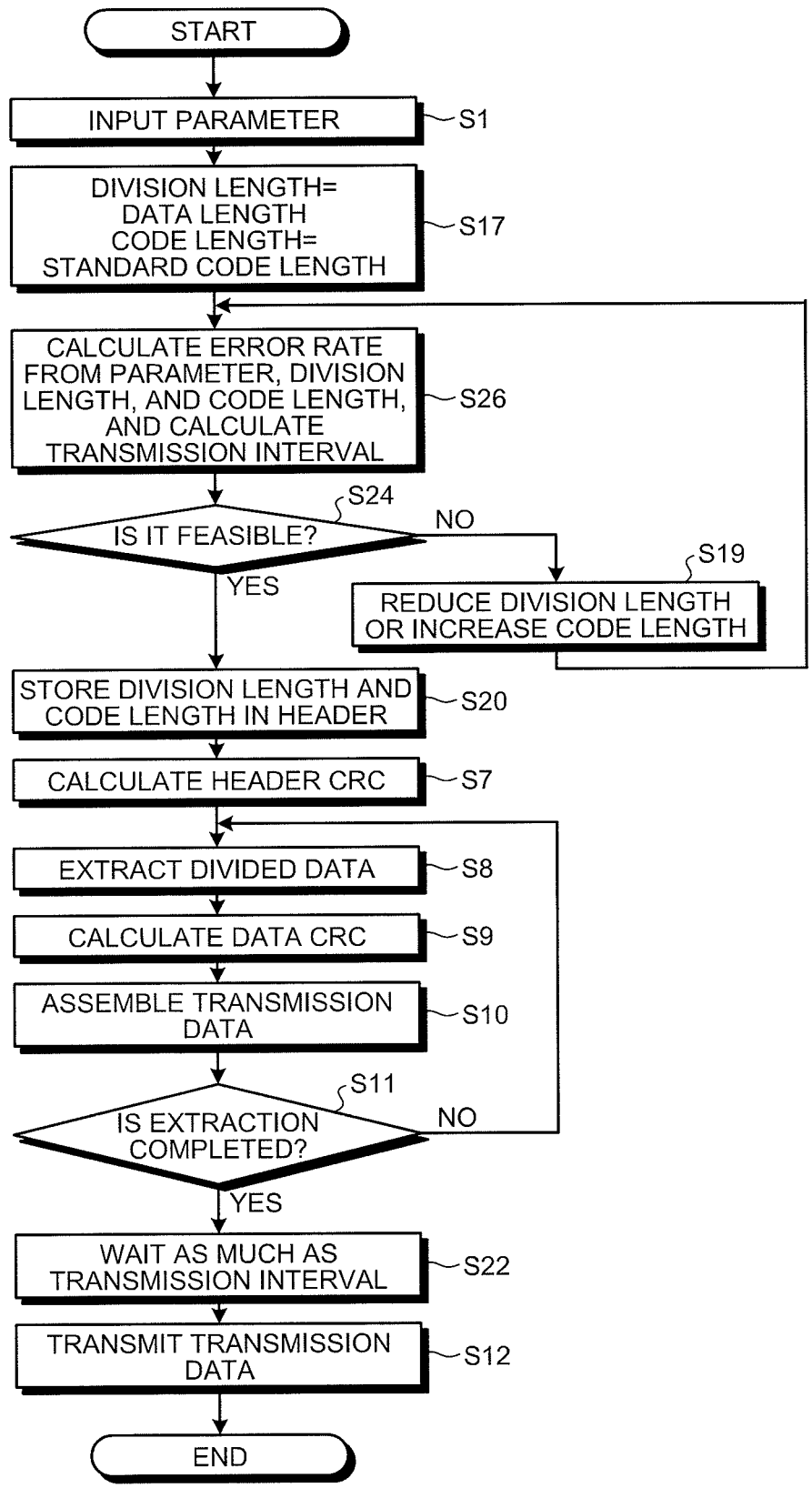

In a seventh embodiment, a modification of the third embodiment will be described. A communication system S7 according to the seventh embodiment includes a transmitting apparatus T7 and the receiving apparatus R3 connected with the communication line C (see FIG. 3-1). FIG. 7-1 is a block diagram for explaining a configuration of the transmitting apparatus T7 of the communication system S7 according to the seventh embodiment. The transmitting apparatus T7 includes the parameter input unit 1, the transmission error non-detection probability judging unit 2, the header and data input unit 3, the division length and code length determining unit 10, the data dividing unit 5, the data CRC generating unit 6, the header CRC generating unit 11, the transmission data assembling unit 7, and the transmitting unit 8.

Because the basic configuration of the transmitting apparatus T7 is the same as that of the transmitting apparatus T3 according to the third embodiment, the different points from the transmitting apparatus T3 will be described below. In the communication system S7 according to the seventh embodiment, the parameter input unit 1 in the transmitting apparatus T3 of the third embodiment receives a parameter from which the number of messages per time is removed. In other words, the transmitting apparatus T7 of the communication system S7 receives a parameter including a reference value of the transmission error non-detection probability of the message per time, a probability of generating bit errors in a communication channel, a transmission rate of the communication channel, and the number of pieces of communication equipment being connected.

The division length and code length determining unit 10 initializes the division length with the data length, and initializes the code length with the length of a standard generator polynomial, and sends the division length, the code length, and the data length to the transmission error non-detection probability judging unit 2. At this time, the transmission error non-detection probability judging unit 2 calculates a transmission interval that can achieve a desired transmission error non-detection probability, by using an evaluation function obtained by modifying the above-described evaluation function (1), based on the delivered division length and the code length, and the received parameter, and notifies the division length and code length determining unit 10 of the transmission interval as a judgment result.

The division length and code length determining unit 10 adopts the division length, the code length, and the transmission interval at this time, and sends the transmission interval to the transmitting unit 8 if the transmission interval is feasible. If the transmission interval is not feasible, the division length and code length determining unit 10 either reduces the division length or increases the code length, and delivers the reduced division length or the increased code length to the transmission error non-detection probability judging unit 2 again. The process is repeated until the feasible transmission interval is obtained. Upon receiving the transmission data (message) from the transmission data assembling unit 7, the transmitting unit 8 waits as much as the transmission interval received from the division length and code length determining unit 10, and transmits the transmission data (message) to the communication line C.

A transmission process performed by the transmitting apparatus T7 will be described with reference to FIG. 7-2. FIG. 7-2 is a flowchart for explaining a process performed by the transmitting apparatus T7 according to the seventh embodiment. The parameter input unit 1 receives a parameter (Step S1). As described above, the parameter does not include the number of messages per time. The parameter input unit 1 sends the received parameter to the transmission error non-detection probability judging unit 2.

The header and data input unit 3 receives data to be transmitted to the receiving apparatus R3, for example, from an application running in the equipment A, after the parameter input unit 1 receives the parameter. The header and data input unit 3 then sends the data length of the data to the division length and code length determining unit 10, and sends a header and data to the data dividing unit 5.

The division length and code length determining unit 10 initializes the division length with the data length, and initializes the code length with the length of a standard generator polynomial, and sends the division length and the code length to the transmission error non-detection probability judging unit 2 (Step S17). The transmission error non-detection probability judging unit 2 calculates a transmission interval that can achieve a desired transmission error non-detection probability (reference value) (Step S26), based on the division length, the data length, and the code length received from the division length and code length determining unit 10, and the parameter received from the parameter input unit 1, and notifies the division length and code length determining unit 10 of the transmission interval as a judgment result.

The division length and code length determining unit 10 determines whether the transmission interval received from the transmission error non-detection probability judging unit 2 is feasible (Step S24). If the transmission interval is not feasible (NO at Step S24), the division length and code length determining unit 10 reduces the division length or increases the code length, and notifies the transmission error non-detection probability judging unit 2 of the data length, the division length, and the code length again (Step S19). The process is repeated until the feasible transmission interval is obtained. If the transmission interval is feasible (YES at Step S24), the division length and code length determining unit 10 adopts the division length, the code length, and the transmission interval at this time, and sends the transmission interval to the transmitting unit 8.

Because the subsequent Steps S20 to S11 are the same as those in the third embodiment, the description thereof is omitted. After Step S11 is performed, upon receiving the transmission data (message) from the transmission data assembling unit 7, the transmitting unit 8 waits as much as the transmission interval received from the division length and code length determining unit 10 from the previous transmission (Step S22), transmits the transmission data (message) to the communication line C, and finishes the series of processes (Step S12). The transmission data (message) transmitted from the transmitting apparatus T7 is sent to the receiving apparatus R3 through the communication line C. The transmitting unit 8 does not need to wait as much as the transmission interval in the first data transmission.

As described above, the transmitting apparatus T7 (communication system S7) according to the seventh embodiment can transmit messages, by dividing data, by adding the CRC, and by controlling the transmission interval at the same time, so as to ensure the upper limit of the non-detection probability of message transmission errors per time. Accordingly, it is possible to perform communication while ensuring the desired reliability of correct communication, by restraining the transmission error non-detection probability of the message to equal to or less than a desired target value. Because unnecessary data division and coding are not performed, it is possible to perform efficient communication.

Eighth Embodiment

In the transmitting apparatuses T1 and T5 according to the first and fifth embodiments, with the parameter for transmitting the initial transmission data (message), the same division length can be obtained at every transmission, by setting the data length to the maximum value in the communication system. In other words, the division length is only calculated during initial transmission, and the calculated division length can be used for the second and subsequent transmissions.

The division length of a message is determined so as to satisfy the conditions, by using the maximum data length of the message in the communication system and a predetermined CRC code length. The transmitting apparatuses T1 and T5 store the division length of the message in a header portion of the message, only during the initial transmission. During the communication, the transmitting apparatuses T1 and T5 divide the messages based on the division length and transmit the messages. The receiving apparatuses R1 refer to the division length of the message stored in the header portion, only during the initial transmission.

According to the eighth embodiment, the division length need not be calculated at every data transmission. Consequently, it is possible to ensure the upper limit of the non-detection probability of message transmission errors per time, and reduce the processing load of the transmitting apparatus at the same time. It is also possible to reduce the processing load applied to the header portion in which the message is stored.

Ninth Embodiment

In the transmitting apparatuses T2 and T6 according to the second and sixth embodiments, with the parameter for transmitting the initial transmission data (message), the same code length can be obtained at every transmission, by setting the data length to the maximum value in the communication system. In other words, the code length is only calculated during initial transmission, and the calculated code length can be used for the second and subsequent transmissions.

In such an event, the CRC code length is determined, by setting the division length of a predetermined message as the maximum data length of the message in the system, when the transmitting apparatuses T2 and T6 start communication. The transmitting apparatuses T2 and T6 store a code (code length) used to identify the type of the CRC code, in the header portion of the message only during the initial transmission. During the communication, the transmitting apparatuses T2 and T6 transmit messages by using the CRC code length. The receiving apparatuses R2 refer to the code (code length) used to identify the type of the CRC code stored in the header portion, only during the initial transmission.

According to the ninth embodiment, the code length need not be calculated at every data transmission. Consequently, it is possible to ensure the upper limit of the non-detection probability of message transmission errors per time, and reduce the processing load of the transmitting apparatus at the same time. It is also possible to reduce the processing load applied to the header portion in which the message is stored.

Tenth Embodiment

In the transmitting apparatuses T3 and T7 according to the third and seventh embodiments, with the parameter for transmitting the initial transmission data (message), the same division length and the code length can be obtained at every transmission, by setting the data length to the maximum value in the communication system. In other words, the division length and the code length are only calculated during initial transmission, and the calculated division length and code length can be used for the second and subsequent transmissions.

In such an event, the division length of a message and the CRC code length are determined, based on the maximum data length of the message in the system, when the transmitting apparatuses T3 and T7 start communication. The transmitting apparatuses T3 and T7 store a code (code length) used to identify the division length of the message and the type of the CRC code, in the header portion of the message, only during the initial transmission. During communication, the transmitting apparatuses T3 and T7 transmit messages by using the division length and the CRC code length. The receiving apparatuses R3 refer to the division length of the message and the type of the CRC code stored in the header portion, only during the initial transmission.

According to the tenth embodiment, the division length and the code length need not be calculated at every data transmission. Consequently, it is possible to ensure the upper limit of the non-detection probability of message transmission errors per time, and reduce the processing load of the transmitting apparatus such as calculating the division length and the code length at the same time. It is also possible to reduce the processing load applied to the header portion in which the message is stored.

Eleventh Embodiment

In the transmitting apparatus T4 according to the fourth embodiment, with the parameter for transmitting the initial transmission data (message), the same transmission interval can be obtained at every transmission, by setting the data length to the maximum value in the communication system. In other words, the interval transmission is only calculated during initial transmission, and the calculated interval transmission can be used for the second and subsequent transmissions.

In such an event, the transmission interval for transmitting messages is determined, so as to satisfy the conditions, by using the maximum data length of the message in the communication system and a predetermined CRC code length, when the transmitting apparatus T4 starts communication. During communication, messages are transmitted by using the transmission interval.

According to the eleventh embodiment, the transmission interval need not be calculated at every data transmission. Consequently, it is possible to ensure the upper limit of the non-detection probability of message transmission errors per time, and reduce the processing load of the transmitting apparatus at the same time.

Twelfth Embodiment

In the transmitting apparatuses according to the first to third embodiments, the division length, the code length, or the transmission interval corresponding to the actual situation can be calculated, by making the parameter input unit 1 receive a parameter whose value is actually measured (such as a probability of generating bit errors in a communication channel and the number of messages per unit time (message frequency)).

The probability of generating bit errors in a communication channel can be measured, by transmitting a predetermined test pattern, and recognizing a bit different from the test pattern at reception. The message frequency can be calculated from an average value of the number of messages per one second at the transmission.

According to the twelfth embodiment, it is possible to perform transmission in which the division length, the code length, or the transmission interval is optimized based on the communication situation, so as to ensure the upper limit of the non-detection probability of message transmission errors per time.

Thirteenth Embodiment

In the transmitting apparatuses in the third embodiment, the seventh embodiment, the tenth embodiment, and the twelfth embodiment, the division length and code length determining unit 10 sets the code length to the minimum value (such as 16 bits) and sets the division length as the data length. The division length and code length determining unit 10 delivers the code length and the division length to the transmission error non-detection probability judging unit 2, and performs process while reducing the division length, until the judgment result of OK is notified from the transmission error non-detection probability judging unit 2.

If the judgment result of OK is obtained from the transmission error non-detection probability judging unit 2, the division length and code length determining unit 10 temporarily stores therein the whole message length. Then, the division length and code length determining unit 10 increases the code length by one, and sets the division length as the data length, and repeats the similar process until the judgment result of OK is notified from the transmission error non-detection probability judging unit 2. If the judgment result of OK is obtained, the division length and code length determining unit 10 temporarily stores therein the whole message length. The division length and code length determining unit 10 performs the process while increasing the code length by one, until the division length and the data length becomes equal.

The division length and code length determining unit 10 sends the division length and the code length of the shortest message length among the message lengths obtained in this manner, to the data dividing unit 5 and the data CRC generating unit 6.

According to the thirteenth embodiment, it is possible to ensure the upper limit of the non-detection probability of message transmission errors per time, and increase the data rate in a message. Consequently, it is possible to perform communication with good line efficiency. If the division length and the CRC code length can be optimized when a number of short transmission message lengths are present for the maximum message length, a data occupancy rate of the message can be increased, and the transmission line can be used effectively.

Fourteenth Embodiment

In the transmitting apparatuses according to the first to the third embodiments, the fifth to the tenth embodiments, the twelfth embodiment, and the thirteenth embodiment, with any one of the division length and the code length or both stored in the header, the data block number to which any one of the division length and the code length or both is applied is correspondingly stored therein. For example, a longer code is added to the data block up to the halfway, and a shorter code is added to the short data block from the halfway, and the division length, the code length (generator polynomial), and the applied data block number are stored in the header. Even in such an event, the transmission error non-detection probability of the whole message also satisfies the reference value.

The receiving apparatus obtains any one of the division length and the code length or both and the data block number stored in the header, and applies any one of the division length and the code length or both to each of the data block.

According to the fourteenth embodiment, it is possible to perform any one of optimum division and coding or both, corresponding to the content of the message.

Fifteenth Embodiment

The receiving apparatuses according to the first to the fourteenth embodiments, if an error is detected in the received message, request the transmitting apparatus to retransmit the message. Based on the request, the transmitting apparatus retransmits the message to the receiving apparatus.

According to the fifteenth embodiment, in the first to the fourteenth embodiments described above, the communication reliability can further be enhanced.

In the first to the fifteenth embodiments, the CRC is uses as an error detection code. However, other error detection codes may also be used.

INDUSTRIAL APPLICABILITY

In this manner, the communication system according to the present invention can be advantageously used for a communication system required to ensure a transmission error non-detection probability per time and that demands high reliability.

The invention claimed is:

1. A transmitting apparatus for transmitting a message to a receiving apparatus in a communication channel using an error detection code, the transmitting apparatus comprising:
    a transmission interval determining unit configured to calculate a transmission error non-detection probability per unit of time based on a predetermined evaluation function and a transmission error non-detection probability per one message at a probability of generating bit errors in the communication channel, and determine a transmission interval for transmitting the message so that the transmission error non-detection probability per unit of time satisfies a predetermined reference value; and
    a transmitting unit configured to transmit the message based on the transmission interval determined by the transmission interval determining unit.

2. The transmitting apparatus according to claim 1, wherein the transmission error non-detection probability per unit of time is further calculated based on an error rate of measurement value of actual communication.

3. The transmitting apparatus according to claim 1, wherein the message is reconfigured by determining a code length of the error detection code without separating the message into a header and data, and by generating the error detection code.

4. A communication system comprising:
    the transmitting apparatus according to claim 1; and
    the receiving apparatus that examines a header portion having a fixed length of a message received from the transmitting apparatus by a predetermined error detection code, and only when no error is detected, divides data of the message into segments and examines divided data by using a predetermined error detection code.

5. The transmitting apparatus according to claim 1, wherein the predetermined evaluation function for the transmission error non-detection probability per unit of time, is based on a probability of generating bit errors in the communication channel, a transmission rate of the communication channel, a number of messages per unit of time, and a number of communication equipment being connected.

6. The transmitting apparatus according to claim 1, wherein the transmission error non-detection probability per unit of time is calculated based on the predetermined evaluation function comprising:
    $\Lambda = 3600 \times R(p) \times v \times (m-1)$, wherein:
    $\Lambda$ is the calculated transmission error non-detection probability per unit in time, v is a number of messages (transmission frequency) per one second, m is a number of devices being connected including the transmitting apparatus, and R(p) is the transmission error non-detection probability per one message, when a probability of generating bit errors in the communication channel is p.

7. The transmitting apparatus according to claim 6, wherein the R(p) is calculated by a following function: R(p)= S (e=d to n){A(n,e)×p^e×(1−p)^(n−e)}, wherein S(e=d to n) is a sum of a value e from d to n, for the subsequent expression in the curly brackets, d is a characteristic value of the error detection code, A(n, e) is a two-term formula comprising =n!×e!/(n−e)!, n is the message length, and n! is the factorial of n, p^e is p raised to the e-th power.

8. A transmitting apparatus for transmitting a message to a receiving apparatus in a communication channel using an error detection code, the transmitting apparatus comprising:
a division length determining unit configured to determine a division length of the message;
a transmitting-side data dividing unit configured to divide data of the message into segments based on the division length;
a data error detection code generating unit configured to generate a data error detection code having a predetermined code length for each of the segments of divided data;
a header error detection code generating unit configured to generate a header error detection code having a predetermined code length for a header of the message;
an assembling unit configured to reconfigure the message with the divided data, the data error detection code, the header, and the header error detection code;
a transmitting unit configured to transmit the message thus reconfigured; and
a judging unit configured to calculate a transmission error non-detection probability per unit of time based on a predetermined evaluation function and a transmission error non-detection probability per one message at a probability of generating bit errors in the communication channel,
wherein the division length determining unit is configured to adopt a data length of the message as an initial value of the division length, and to reduce the division length until the judging unit determines that the transmission error non-detection probability per unit of time satisfies a predetermined reference value.

9. The transmitting apparatus according to claim 8, wherein the transmission error non-detection probability per unit of time is further calculated based on an error rate of measurement value of actual communication.

10. The transmitting apparatus according to claim 8, wherein the message is reconfigured by determining the code length without separating the message into the header and data, and by generating the error detection code.

11. A communication system comprising:
the transmitting apparatus according to claim 8; and
the receiving apparatus that examines a header portion having a fixed length of a message received from the transmitting apparatus by a predetermined error detection code, and only when no error is detected, divides data of the message into segments and examines divided data by using a predetermined error detection code.

12. A transmitting apparatus for transmitting a message to a receiving apparatus in a communication channel using an error detection code, the transmitting apparatus comprising:

a transmitting-side data dividing unit configured to divide data of the message into segments based on a predetermined division length;
a code length determining unit configured to determine a code length of the error detection code added to data of the message divided into segments;
a data error detection code generating unit configured to generate a data error detection code having the code length thus determined for each of the segments of divided data;
a header error detection code generating unit configured to generate a header error detection code having a predetermined code length for a header of the message;
an assembling unit configured to reconfigure the message with the divided data, the data error detection code, the header, and the header error detection code;
a transmitting unit configured to transmit the message thus reconfigured; and
a judging unit configured to calculate a transmission error non-detection probability per unit of time based on a predetermined evaluation function and a transmission error non-detection probability per one message at a probability of generating bit errors in the communication channel,
wherein the code length determining unit is configured to adopt a standard code length as an initial value of the code length, and increases the code length until the judging unit determines that the transmission error non-detection probability per unit of time satisfies a predetermined reference value.

13. The transmitting apparatus according to claim 12, wherein the transmitting apparatus uses a correspondence table that indicates a correspondence relationship between the code length of the message and the error detection code corresponding to the code length, in common with the receiving apparatus.

14. The transmitting apparatus according to claim 12, wherein the transmission error non-detection probability per unit of time is further calculated based on an error rate of measurement value of actual communication.

15. The transmitting apparatus according to claim 12, wherein the message is reconfigured by determining the code length without separating the message into a header and data, and by generating an error detection code.

16. A communication system comprising:
the transmitting apparatus according to claim 12; and
the receiving apparatus that examines a header portion having a fixed length of a message received from the transmitting apparatus by a predetermined error detection code, and only when no error is detected, divides data of the message into segments and examines divided data by using a predetermined error detection code.

17. A transmitting apparatus for transmitting a message to a receiving apparatus in a communication channel using an error detection code, the transmitting apparatus comprising:
a division length and code length determining unit configured to determine a division length of the message and a code length of the error detection code added to the message,
a transmitting-side data dividing unit configured to divide data of the message into segments based on the division length;
a data error detection code generating unit configured to generate a data error detection code having the code length thus determined for each of the segments of divided data;

a header error detection code generating unit configured to generate a header error detection code having a predetermined code length for a header of the message;

an assembling unit configured to reconfigure the message with the divided data, the data error detection code, the header, and the header error detection code; and a transmitting unit configured to transmit the reconfigured message; and a judging unit configured to calculate a transmission error non-detection probability per unit of time based on a predetermined evaluation function and a transmission error non-detection probability per one message at a probability of generating bit errors in the communication channel, wherein the division length and code length determining unit is configured to adopt a data length of the message as an initial value of the division length, is configured to adopt a standard code length as an initial value of the code length, and configured to reduce the division length or to increase the code length until the judging unit determines that the transmission error non- detection probability per unit of time satisfies a predetermined reference value.

18. The transmitting apparatus according to claim 17, wherein the transmitting apparatus uses a correspondence table that indicates a correspondence relationship between the code length of the message and the error detection code corresponding to the code length, in common with the receiving apparatus.

19. The transmitting apparatus according to claim 17, wherein the transmission error non-detection probability per unit of time is further calculated based on an error rate of measurement value of actual communication.

20. The transmitting apparatus according to claim 17, wherein the message is reconfigured by determining the code length without separating the message into the header and data, and by generating the error detection code.

21. A communication system comprising:
the transmitting apparatus according to claim 17; and
the receiving apparatus that examines a header portion having a fixed length of a message received from the transmitting apparatus by a predetermined error detection code, and only when no error is detected, divides data of the message into segments and examines divided data by using a predetermined error detection code.

22. A transmitting apparatus for transmitting a message to a receiving apparatus in a communication channel using an error detection code, the transmitting apparatus comprising:
a transmitting-side data dividing unit configured to divide data of the message into segments based on a division length;
a data error detection code generating unit configured to generate a data error detection code for each of the segments of divided data;
a header error detection code generating unit configured to generate a header error detection code for a header of the message;
an assembling unit configured to reconfigure the message with the divided data, the data error detection code, the header, and the header error detection code;
a transmitting unit configured to transmit the reconfigured message;
a judging unit configured to calculate a transmission error non-detection probability per unit of time based on a predetermined evaluation function and a transmission error non-detection probability per one message at a probability of generating bit errors in the communication channel; and
a transmission interval determining unit configured to determine a transmission interval for transmitting the reconfigured message so that the transmission error non-detection probability per unit of time satisfies a predetermined reference value.

23. The transmitting apparatus according to claim 22, wherein:
the judging unit is further configured to determine whether the transmission error non-detection probability per unit of time satisfies the predetermined reference value,
the transmitting apparatus further comprises a division length determining unit configured to determine the division length so that the transmission error non-detection probability per unit of time satisfies the predetermined reference value, and
the transmitting-side data dividing unit is further configured to divide the data of the message into segments based on the determined division length.

24. The transmitting apparatus according to claim 23, wherein the division length of the message is determined, by using a maximum data length of the message and the error detection code having a code length, at a start of communication with the receiving apparatus, and the reconfigured message is transmitted by using the determined division length, during communication with the receiving apparatus.

25. The transmitting apparatus according to claim 24, wherein the division length is stored in a header portion or a data portion of the message and transmitted, only during initial communication with the receiving apparatus.

26. The transmitting apparatus according to claim 22, wherein:
the judging unit is further configured to determine whether the transmission error non-detection probability per unit of time satisfies the predetermined reference value
the transmitting apparatus further comprises a code length determining unit configured to determine a code length of the data error detection code added to the message so that the transmission error non-detection probability per unit of time satisfies the predetermined reference value, and
the data error detection code generating unit is further configured to generate the data error detection code by the determined code length.

27. The transmitting apparatus according to claim 26, wherein the code length is determined, by setting a maximum data length of the message as the division length, at a start of communication with the receiving apparatus, and the reconfigured message is transmitted by using the determined code length, during communication with the receiving apparatus.

28. The transmitting apparatus according to claim 27, wherein the code length is stored in a header portion or a data portion of the message and transmitted, only during the initial communication with the receiving apparatus.

29. The transmitting apparatus according to claim 22,
wherein the judging unit is further configured to determine whether the transmission error non-detection probability per unit of time satisfies the predetermined reference value,
wherein the transmitting apparatus further comprising a division length and code length determining unit configured to determine the division length of the message and a code length of the data error detection code added to the message, so that the transmission error non-detection probability per unit of time satisfies the predetermined reference value, wherein the transmitting-side data dividing unit is further configured to divide the data of the message into segments based on the determined division length, and wherein the data error detection code generating unit is further configured to generate the data error detection code having the determined code length.

30. The transmitting apparatus according to claim 29, wherein the division length and the code length are determined, by using a maximum data length of the reconfigured message, at a start of communication with the receiving apparatus, and the message is transmitted by using the division length and the code length thus determined, during communication with the receiving apparatus.

31. The transmitting apparatus according to claim 30, wherein the division length and the code length are stored in a header portion or a data portion of the message and transmitted, only during the initial communication with the receiving apparatus.

32. The transmitting apparatus according to claim 29, wherein the division length and the code length are determined, so that a length of the message thus divided for the error detection code is maximum.

33. The transmitting apparatus according to claim 22, wherein the transmission interval is determined by using a maximum data length of the message and the data error detection code having a predetermined code length, at a start of communication with the receiving apparatus, and the reconfigured message is transmitted by using the transmission interval thus determined, during communication with the receiving apparatus.

34. The transmitting apparatus according to claim 22, wherein the transmission error non-detection probability per unit of time is further calculated based on an error rate of measurement value of actual communication.

35. The transmitting apparatus according to claim 22, wherein the message is reconfigured by determining a code length of the error detection code without separating the message into the header and data, and by generating the error detection code.

36. A communication system comprising:
the transmitting apparatus according to claim 22; and
the receiving apparatus that examines a header portion having a fixed length of a message received from the transmitting apparatus by a predetermined error detection code, and only when no error is detected, divides data of the message into segments and examines divided data by using a predetermined error detection code.

* * * * *

UNITED STATES PATENT AND TRADEMARK OFFICE
CERTIFICATE OF CORRECTION

| | | |
|---|---|---|
| PATENT NO. | : 8,875,004 B2 | Page 1 of 1 |
| APPLICATION NO. | : 12/668346 | |
| DATED | : October 28, 2014 | |
| INVENTOR(S) | : Washio et al. | |

It is certified that error appears in the above-identified patent and that said Letters Patent is hereby corrected as shown below:

In the Claims

Col. 40 line 49-54 claim 27, should read,

The transmitting apparatus according to claim 3, wherein the message is reconfigured by determining the code length without separating the message into the[[a]] header and data, and by generating the[[an]] error detection code.

Signed and Sealed this
Twenty-third Day of June, 2015

Michelle K. Lee
*Director of the United States Patent and Trademark Office*